(12) United States Patent
Swami et al.

(10) Patent No.: US 11,057,946 B2
(45) Date of Patent: Jul. 6, 2021

(54) METHOD AND DEVICE FOR MANAGING WIRELESS CONNECTION

(71) Applicant: Samsung Electronics Co., Ltd., Suwon-si (KR)

(72) Inventors: Bhagwan Dass Swami, Kasumbi (IN); Vijay Kumar Mishra, Bangalore (IN); Srihari Kuncha, Bangalore (IN); Sunil Kumar Venkata Bonda, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/641,191

(22) PCT Filed: Aug. 6, 2018

(86) PCT No.: PCT/KR2018/008880
§ 371 (c)(1),
(2) Date: Feb. 21, 2020

(87) PCT Pub. No.: WO2019/050166
PCT Pub. Date: Mar. 14, 2019

(65) Prior Publication Data
US 2020/0267779 A1 Aug. 20, 2020

(30) Foreign Application Priority Data

Sep. 8, 2017 (IN) .............................. 201741031862
May 25, 2018 (IN) .............................. 201741031862

(51) Int. Cl.
*H04W 76/10* (2018.01)
*H04W 48/16* (2009.01)
*H04W 48/20* (2009.01)

(52) U.S. Cl.
CPC ........... *H04W 76/10* (2018.02); *H04W 48/16* (2013.01); *H04W 48/20* (2013.01)

(58) Field of Classification Search
CPC ..... H04W 76/10; H04W 48/16; H04W 48/20; H04W 76/27; H04W 84/12
See application file for complete search history.

(56) References Cited

U.S. PATENT DOCUMENTS 9,270,682 B2 * 2/2016 Boudreau ............. H04L 63/102
9,288,276 B2    3/2016 Adamczyk et al.
(Continued)

FOREIGN PATENT DOCUMENTS

EP    3010287 A1    4/2016
WO    2014089427 A1    6/2014
WO    2017114761 A1    7/2017

OTHER PUBLICATIONS

ISA/KR, International Search Report and Written Opinion of the International Searching Authority, International Application No. PCT/KR2018/008880, dated Oct. 8, 2018, 13 pages.
(Continued)

*Primary Examiner* — Diane D Mizrahi

(57) ABSTRACT

The embodiments herein provide a method for managing a wireless connection in a device. The method includes detecting a plurality of WAPs. Further, the method includes determining a current state of the device. Further, the method includes determining a WAP from the plurality of WAPs based on the current state of the device and a priority data associated with each of the WAPs. Further, the method includes establishing the wireless connection with the WAP. Furthermore, the method includes resolving conflicts at the device based on the current state of the device.

20 Claims, 18 Drawing Sheets

(56) References Cited

U.S. PATENT DOCUMENTS

| | | |
|---|---|---|
| 10,057,775 B2 | 8/2018 | Raleigh et al. |
| 2014/0022918 A1 | 1/2014 | Guo et al. |
| 2014/0064123 A1 | 3/2014 | Kim |
| 2014/0080539 A1 | 3/2014 | Scherzer et al. |
| 2015/0230127 A1* | 8/2015 | Raleigh .............. H04L 47/824 370/230 |
| 2017/0142649 A1 | 5/2017 | El-Moussa et al. |

OTHER PUBLICATIONS

Examination Report dated Mar. 22, 2021 in connection with Indian Application No. 201741031862, 5 pages.

* cited by examiner

METHOD AND DEVICE FOR MANAGING WIRELESS CONNECTION

CROSS-REFERENCE TO RELATED APPLICATIONS

This application is a National Phase Entry of PCT international Application No. PCT/KR2018/008880, which was filed on Aug. 6, 2018, and claims priority to Indian Provisional Patent Application No. 201741031862 filed on Sep. 8, 2017 and Indian Complete Patent Application No. 201741031862 filed on May 25, 2018 in the Indian Intellectual Property Office, the contents of which are incorporated herein by reference.

BACKGROUND

1. Field

The present disclosure relates to wireless communication. More particularly, the present disclosure relates to a method and an electronic device for managing a wireless connection in a wireless communication system.

2. Description of Related Art

The evolution of mobile communication services has yielded numerous protocols and access networks for enabling communication between an electronic device and the Internet/wireless networks. In general, the electronic device enables a connection with a wireless access point (WAP) in addition to a cellular network such as long-term evolution (LTE) to access the network resources and network services of the wireless network. However, there exist a trouble in selecting the WAP from a plurality of WAPs for establishing a reliable connection between the electronic device and the wireless network.

In general, there are lot of methods for the electronic device to decide and select the WAP from the plurality of WAPs in the wireless network using client-based control policies or server-based control policies. Few methods adopt the client-based control policies such as a qualified network selector (QNS) and a smart network switch (SNS) to select the WAP for establishing the connection with the wireless network. Consider a scenario in which a preference is given to the client-based control policies for selecting the WAP then, the method includes selecting the WAP which is pre-configured by a user on the electronic device. However, the method allows the electronic device to choose the WAP which is statically pre-configured by the user without considering the network traffic.

FIG. 1 is an example scenario in which the electronic device 100 establishes a wireless connection with the WAP 102a from the plurality of WAPs (102a-102n) based on instruction from an access network discovery and selection function (ANDSF) server 108, according to a prior art. Consider the preference is given to the server-based control policies for selecting the WAP 102a then, the ANDSF server 108 can give instruction to the electronic device 100 for selecting the WAP 102a from the plurality of WAPs (102a-102n) via eNodeB (eNB) 106 using an S14 interface 104. Further, based on the instruction from the ANDSF server 108, the electronic device 100 connects to the WAP 102a (e.g., a trusted WAP), where the trusted WAP is hosted by the service provider/operator. However, if a multiple trusted WAPs are available due to a multi-SIMs (multi-subscriber identity module) in the electronic device 100 then, there exists a conflict between the multiple trusted WAPs. However, there is no method for effectively selecting the WAP 102a in all circumstances, as each policy is lacking in selecting the WAP 102a from the plurality of WAPs (102a-102n).

Thus, it is desired to address the above mentioned disadvantages or other shortcomings or at least provide a useful alternative.

The above information is presented as background information only to assist with an understanding of the present disclosure. No determination has been made, and no assertion is made, as to whether any of the above might be applicable as prior art with regard to the present disclosure.

SUMMARY

The present disclosure has been made to address at least the above problems and/or disadvantages and to provide at least the advantages described below. Accordingly, an aspect of the present disclosure is to provide a method and device for managing wireless connection in a wireless communication system. The technical solution of the present disclosure includes the following.

Another aspect of the present disclosure is to provide a method and device for managing wireless connection that are capable of dynamically determining a WAP from a plurality of WAPs based on a current state of the electronic device and a priority data associated with each of the WAPs.

Another aspect of the present disclosure is to provide a method and device for managing wireless connection that are capable of dynamically selecting the WAP having a highest priority from the plurality of WAPs to establish the wireless connection.

Another aspect of the present disclosure is to provide a method and device for managing wireless connection that are capable of dynamically establishing the wireless connection with other WAP from the plurality of WAPs in response to determining that the data speed of the WAP does not meet a threshold criteria.

Another aspect of the present disclosure is to determine a conflict among a plurality of WAP policies to connect to the WAP from the plurality of WAPs.

Another aspect of the present disclosure is to provide a method and device for managing wireless connection that are capable of determining a WAP policy from the plurality of WAP policies to connect to a first WAP from the plurality of WAPs.

Another aspect of the present disclosure is to provide a method and device for managing wireless connection that are capable of dynamically determining a second WAP by overriding the WAP policy associated with the first WAP.

In accordance with an aspect of the present disclosure, a method for managing a wireless connection in a device is provided. The method includes detecting a plurality of WAPs. Further, the method includes determining a current state of the device. Further, the method includes determining a WAP from the plurality of WAPs based on the current state of the device and a priority data associated with each of the plurality of WAPs. Furthermore, the method includes establishing the wireless connection with the WAP.

In an embodiment of the present disclosure, determining the WAP from the plurality of WAPs based on the current state of the device and the priority data associated with each of the plurality of WAPs includes obtaining the priority data associated with each of the plurality of WAPs, determining a new priority data for each of the plurality of WAPs based on the current state of the device, reprioritizing each of the plurality of WAPs based on the new priority data and dynamically selecting the WAP having a highest priority from the plurality of WAPs to establish the wireless connection.

In an embodiment of the present disclosure, the priority data is a weightage value assigned to each WAP over the plurality of WAPs.

In an embodiment of the present disclosure, the current state indicates at least one of a number of applications running in a foreground in the device, a number of applications running in a background in the device, a type of application running in the foreground in the device, a type of application running in the background in the electronic device, a current state of battery of the device, a user preference, and a WAP operator preference.

In an embodiment of the present disclosure, the method further includes determining whether a data speed of the WAP meets a threshold criteria. The method further includes determining the current state of the device. The method further includes dynamically determining other WAP from the plurality of WAPs based on the current state of the device. The method furthermore includes dynamically establishing the wireless connection with the other WAP from the plurality of WAPs in response to determining that the data speed of the WAP does not meet the threshold criteria.

In accordance with another aspect of the disclosure, a method for managing a wireless connection in a device is provided. The method includes detecting a plurality of WAPs. Further, the method includes determining a conflict among a plurality of WAP policies to connect to a WAP from the plurality of WAPs. Further, the method includes determining a current state of the device. Further, the method includes determining a WAP from the plurality of WAPs based on the current state of the device and a priority data associated with each of the plurality of WAPs. Furthermore, the method includes establishing the wireless connection with the WAP.

In an embodiment of the present disclosure, the plurality of WAP policies include a device-defined policy, a server-defined policy, and an operator defined policy.

In accordance with another aspect of the present disclosure, a method for managing a wireless connection in a device is provided. The method includes detecting a plurality of WAPs. Further, the method includes determining a WAP policy to connect to a first WAP from the plurality of WAPs. Further, the method includes determining a current state of the device. Further, the method includes determining a second WAP from the plurality of WAPs based on the current state of the device and a priority data associated with each of the plurality of WAPs, where the second WAP from the plurality of WAPs is determined by overriding the WAP policy. Furthermore, the method includes automatically establishing the wireless connection with the second WAP.

In accordance with another aspect of the present disclosure, a device for managing a wireless connection is provided. The device includes a WAP controller coupled with a memory and a processor. The WAP controller is configured to detect a plurality of WAPs. Further, the WAP controller is configured to determine a current state of the device. Further, the WAP controller is configured to determine a WAP from the plurality of WAPs based on the current state of the device and a priority data associated with each of the WAPs. Further, the WAP controller is configured to automatically establish the wireless connection with the WAP.

In accordance with an aspect of the present disclosure, a device for managing a wireless connection is provided. The device includes a WAP controller coupled with a memory and a processor. The WAP controller is configured to detect a plurality of WAPs. Further, the WAP controller is configured to determine a conflict among a plurality of WAP policies to connect to a WAP from the plurality of WAPs. Further, the WAP controller is configured to determine a current state of the device. Further, the WAP controller is configured to determine a WAP from the plurality of WAPs based on the current state of the device and a priority data associated with each of the plurality of WAPs. Furthermore, the WAP controller is configured to establish the wireless connection with the WAP.

In accordance with another aspect of the present disclosure, a device for managing a wireless connection is provided. The device includes a WAP controller coupled with a memory and a processor. The WAP controller is configured to detect a plurality of WAPs. Further, the WAP controller is configured to determine a WAP policy to connect to a first WAP from the plurality of WAPs. Further, the WAP controller is configured to determine a current state of the device. Further, the WAP controller is configured to determine a second WAP from the plurality of WAPs based on the current state of the device and a priority data associated with each of the WAPs, where the second WAP from the plurality of WAPs is determined by overriding the WAP policy. Furthermore, the WAP controller is configured to establish the wireless connection with the second WAP.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
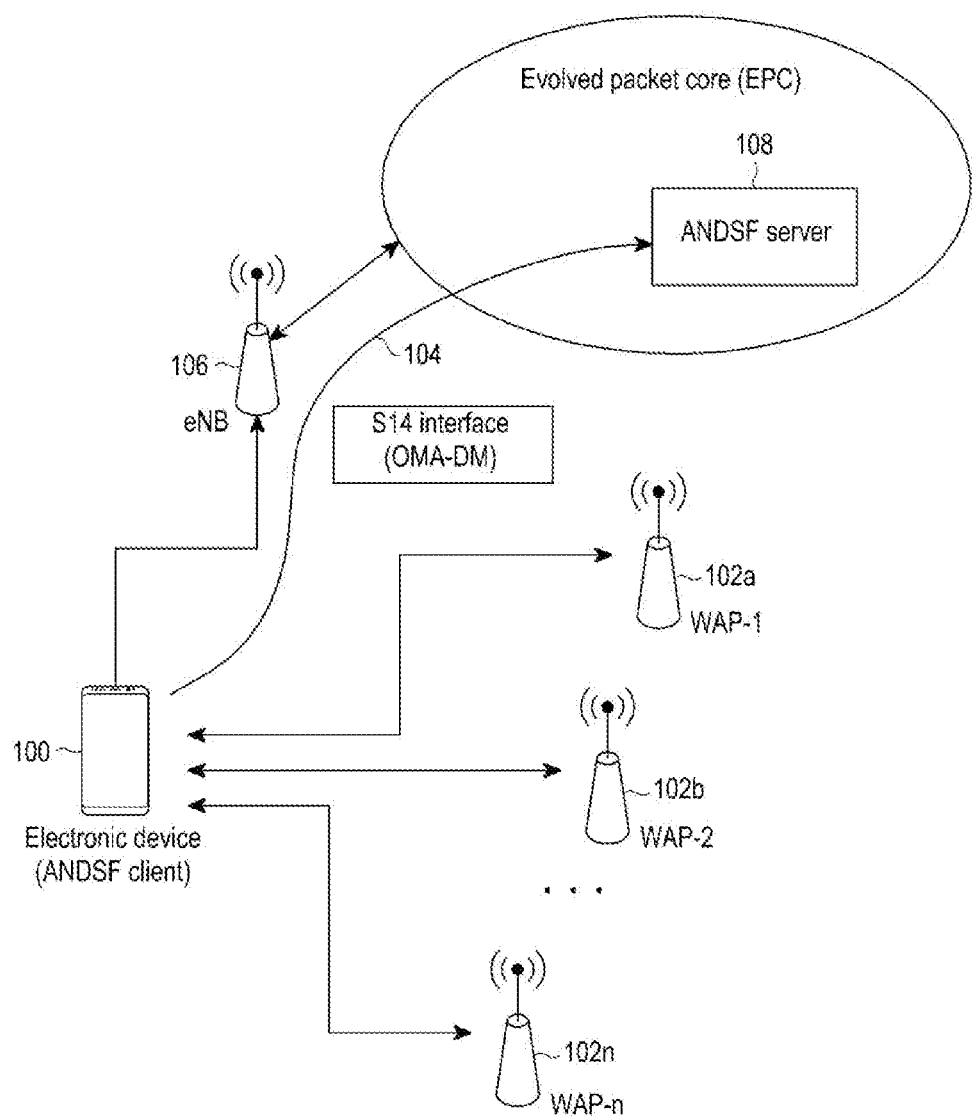
FIG. 1 is an example scenario in which an electronic device establishes a wireless connection with a WAP from a plurality of WAPs based on instruction from a ANDSF server, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein disclose a method for managing a wireless connection in an electronic device. The method includes detecting by the electronic device a plurality of WAPs. Further, the method includes determining by the electronic device a current state of the electronic device. Further, the method includes dynamically determining by the electronic device a WAP from the plurality of WAPs based on the current state of the electronic device and a priority data associated with each of the WAPs. Furthermore, the method includes automatically establishing by the electronic device the wireless connection with the WAP.

Unlike to conventional methods and systems, the proposed method can be used to dynamically select the WAP in order to establish the wireless connection with a wireless communication network based on the current state of the electronic device. Further, the proposed method can be used to resolve a conflict between a server-side WAP policy (e.g., ANDSF) and an electronic-device side WAP policy (e.g., QNS, SNS) based on the current state of the electronic device (e.g., user preference, or the like). Hence, this results in effectively selecting the WAP for better performance.

In conventional methods and systems, the electronic device establishes the wireless connection with the WAP based on the priority data associated with each of the WAPs from a server. Hence, the method does not consider the current state (e.g., usage pattern, interrupts, or the like) of the electronic device which results in a poor wireless connection. Unlike to conventional methods and systems, the proposed method can be used to reprioritize the priority data for each WAPs based on the user preference. Hence, this results in providing an efficient wireless connection to the electronic device, which increases a user experience.

Unlike to conventional methods and systems, the proposed method can be used to resolve the conflict in selecting the WAP from the plurality of WAPs, for the electronic device having a multi-SIM/multi-operator configuration. The electronic device receives a plurality of WAP polices from the server for establishing the wireless connection. Further, the electronic device determines that there exist the conflict among the plurality of WAP polices. Under such circumstance, the electronic device can be configured to select a WAP policy from the plurality of WAP polices to connect with the WAP based on the user preference. If the user preference indicates predefined network settings then, the electronic device chooses the WAP based on the predefined network settings. If the user preference indicates an operator preference then, a faster WAP is recommended by the server when an application is running in a foreground of the electronic device, and a slower WAP is recommended when the application is running in a background of the electronic device.

In the conventional methods and systems, the conflict among the WAP policies are resolved at the server, and the electronic device may connect with the WAP based on instruction from the server (e.g., an ANDSF server) irrespective of the current state of the electronic device. Unlike to conventional methods and systems, the proposed method can be used to resolve the conflict at the electronic device, and establish the wireless connection with the WAP based on determining the current state of the electronic device and the priority data associated with each of the WAPs.

Consider an example, in which a user is located in a shopping mall and the user is having a premium membership (such as 40 Mbps for premium users) with a WiFi in the shopping mall. Consider there is one t-mobile operator (TMO) WiFi (such as 8 Mbps, unlimited data) which has a coverage in the shopping mall, and the user is also subscribed with TMO WiFi and the user is roaming around the shopping mall. In general, when the user assigns the predefined network settings as a third party WiFi (e.g., WiFi in the shopping mall) then, the electronic device normally connects with the WiFi in the shopping mall, which is costlier based on a membership plan. Based on the proposed method, the electronic device determines the current state of the electronic device (for e.g., updating application in the background) then, the electronic device automatically switches to a low-cost and a slower WiFi (e.g., TMO WiFi), as the application is running in the background of the electronic device. The electronic device selects the WiFi which is more suitable based on the current application executed in the electronic device by overriding the predefined network setting.

Referring now to the drawings, and more particularly to FIG. 2 to FIG. 9, FIG. 10B, FIG. 11B, FIG. 12B and FIG. 13 to FIG. 17, there are shown preferred embodiments.

Figure 2:
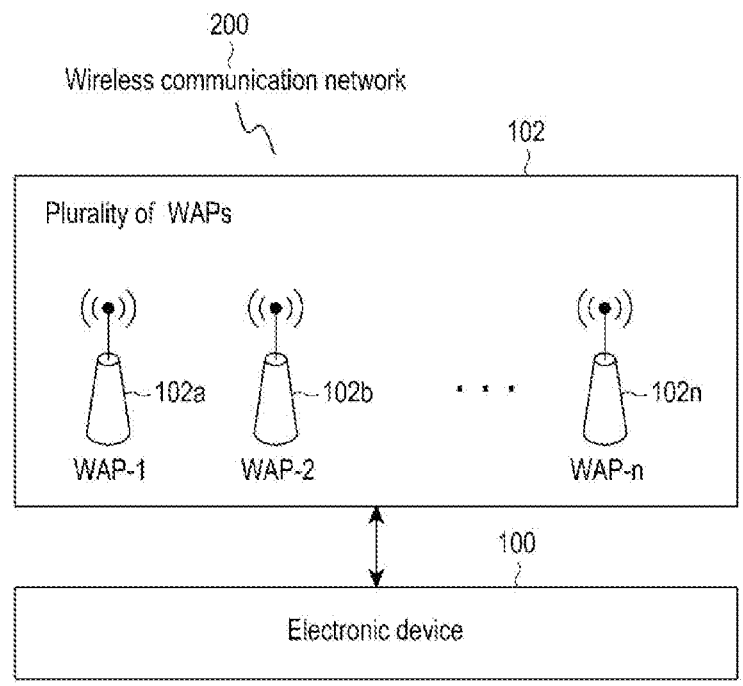
FIG. 2 illustrates a wireless communication network in which the electronic device establishes the wireless connection with the WAP from the plurality of WAPs, according to an embodiment of the present disclosure.

FIG. 2 illustrates a wireless communication network 200 in which an electronic device 100 establishes the wireless connection with a WAP 102a from a plurality of WAPs 102a-102n (hereinafter used as plurality of WAPs 102), according to an embodiment of the present disclosure. In an embodiment of the present disclosure, the wireless communication network 200 (hereinafter network 200) includes the plurality of WAPs 102 and the electronic device 100. The wireless communication network 200 can be a cellular network, for example a 3GPP long term evolution (LTE) network such as an evolved universal terrestrial radio access network (E-UTRAN), 4G, 5G. In another embodiment of the present disclosure, the network 200 can be a wireless local area network (WLAN) such as an institute of electrical and electronics engineers (IEEE) 802.11 Wi-Fi network. In another embodiment of the present disclosure, the network 200 can include a base station such as eNodeB (eNB), configured to wirelessly communicate with the electronic device 100.

The electronic device 100 communicates with the network 200 for providing one or more data services to a user. In an example, the data service can be, for example, voice communication, text messaging, multimedia streaming, and Internet access. The electronic device 100 can be configured to access the network 200 via any one of WAP 102a from a plurality of WAPs 102. The electronic device 100 can be, for example, but not limited to, a smartphone, a mobile phone, a laptop, a desktop computer, a Personal Digital Assistant (PDA), a tablet, a phablet, or any other electronic device.

In 3GPP, a server (e.g., ANDSF server) can be used to provide WAP policies to the electronic device 100 for selecting the WAP 102a. The ANDSF server (not shown) allows a mobile network operator to define the WAP policies for accessing network resources in the network 200. The mobile network operator can influence the WAP selection of the electronic device 100 via configuring one or more WAP policies, where the one or more WAP policies are distributed to the electronic device 100 from the ANDSF server. Further, the WAP policies can indicate a priority for each WAPs in which the electronic device 100 should follow while selecting the WAP 102a. Based on the priority data, the electronic device 100 selects the WAP 102a from the plurality of WAPs 102.

In an example, the ANDSF server can monitor current network conditions and then transmit an updated priority list for each of the WAP to the electronic device 100. In an example, the electronic device 100 can be ANDSF client.

In an embodiment of the present disclosure, the network 200 includes the plurality of WAPs 102 which are steered from both the server (e.g., ANDSF server) and the electronic device 100. The electronic device 100 can be configured to detect the plurality of WAPs 102.

In an embodiment of the present disclosure, the electronic device 100 can be configured to select the WAP 102a based on a current state of the electronic device 100. For example, the electronic device 100 selects the WAP 102a based on requirements of the application (e.g., voice application, video application, video game application, browsing application, etc.).

The electronic device 100 determines the current state of the electronic device 100. In an embodiment of the present disclosure, the current state indicates a number of applications running in a foreground of the electronic device 100. In an embodiment of the present disclosure, the current state indicates a type of application running in the foreground in the electronic device 100. For example, consider a scenario that the user is listening to music and performing a chat in the electronic device 100 then, there are two applications running in the foreground, and the type of applications are a music application and a chat application.

In an embodiment of the present disclosure, the current state indicates the number of applications running in a background of the electronic device 100. In an embodiment of the present disclosure, the current state indicates the type of application running in the background of the electronic device 100. For example, consider a scenario that the electronic device 100 performs update on all the applications then, the number of applications running in the background is a total number of applications running in the electronic device 100.

In an embodiment of the present disclosure, the current state indicates the current state of battery of the electronic device 100. For example, the current state of battery indicates a battery level, lifetime of the battery, or the like.

In an embodiment of the present disclosure, the current state indicates a user preference. The user preference can include a predefined network setting, a membership/subscription information, a usage history, a usage pattern, a battery preference information or the like.

In an embodiment of the present disclosure, the current state indicates a WAP operator preference. The WAP operator preference is defined by the mobile network operator based on a parameter such as congestion, a traffic overload, a load balancing, etc.

In response to determining the current state of the electronic device 100, further, the electronic device 100 can be configured to dynamically determine the WAP 102a from the plurality of WAPs 102 based on the current state of the electronic device 100 and a priority data associated with each of the WAPs.

In an embodiment of the present disclosure, the priority data for each of the WAPs is provided by one of the server (e.g., ANDSF server) and the electronic device 100. In an embodiment of the present disclosure, the priority data is a weightage value assigned to each WAP over the plurality of WAPs 102. The electronic device 100 obtains the priority data associated with each of the WAPs and determines a new priority data for each of the WAPs based on the current state of the electronic device 100 and the current network conditions. Further, the electronic device 100 reprioritizes each of the WAPs based on the new priority data. Further, the electronic device 100 dynamically selects the WAP 102a having a highest priority from the plurality of WAPs 102 to establish the wireless connection.

For example, the electronic device 100 receives the priority data for plurality of WAPs 102 for e.g., WAP 102b has high priority, WAP 102c has medium priority, and WAP 102a has low priority. Further, the user preference is selecting the WAP 102c which minimizes a power consumption. Based on the user preference, the electronic device 100 reprioritizes each of the WAPs accordingly such as WAP 102c has high priority, WAP 102b has medium priority, and WAP 102a has low priority. Further, the electronic device 100 selects the WAP 102c having the highest priority from the plurality of WAPs 102 to establish the wireless connection.

Further, the electronic device 100 determines a conflict among the WAP policies to connect to the WAP 102a from the plurality of WAPs 102. Consider a scenario in which the electronic device 100 includes multiple SIMs and there exists the conflict with the multiple WAP policies for connecting with one WAP 102a to establish the wireless connection. In such cases, the electronic device 100 can be configured to determine the user preference such as the predefined network setting. Consider that the user has set the predefined network setting as the operator WAP preference then, the electronic device 100 can be configured to dynamically select the WAP 102a which is faster for streaming application or the WAP 102b which is slower for browsing application.

Based on the determination, the electronic device 100 can be configured to automatically establish the wireless connection with the WAP 102a. Further, the electronic device 100 can be configured to determine whether a data speed of the WAP 102a meets a threshold criteria. The electronic device 100 can be configured to check the data speed to ensure connectivity with the network 200. If the data speed of the WAP 102a meets the threshold criteria then, the electronic device 100 can be configured to continue connect with the WAP 102a.

If the data speed of the WAP 102a does not meet a threshold criteria then, the electronic device 100 can be configured to again check the current state of the electronic device 100. Further, the electronic device 100 can be configured to dynamically determine other WAP 102b from the plurality of WAPs 102 based on the current state of the electronic device 100. Furthermore, the electronic device 100 can be configured to dynamically establish the wireless connection with the other WAP 102b from the plurality of WAPs 102 in response to determining that the data speed of the WAP 102a does not meet the threshold criteria.

For example, consider a scenario in which the smartphone of the user connects with the WAP 102a available in a home network. Further, due to an increased number of users in the home network, a flickering in internet connection may result. Based on the determination, the smartphone automatically switches to the other WAP 102b or the cellular network to establish the internet connection.

In another embodiment of the present disclosure, the electronic device 100 can be configured to determine a WAP policy which is suitable to connect to a first WAP 102a from the plurality of WAPs 102. If there is any change in the network conditions then, the electronic device 100 can be configured to again determine the current state of the electronic device 100. Further, the electronic device 100 can be configured to dynamically determine a second WAP 102b from the plurality of WAPs 102 based on the current state of the electronic device 100. The second WAP 102a from the plurality of WAPs 102 is determined by overriding the WAP policy. Further, the electronic device 100 establishes the wireless connection with the second WAP 102a to ensure better wireless connection with the network 200.

Consider an example scenario in which the user is playing online games in the electronic device 100. Further, there are plurality of WAPs 102 and a 4G LTE network (cellular network) are available for accessing the network 200. The electronic device 100 receives the priority data for each of WAP from the server. Further, the electronic device 100 determines the WAP 102a having the highest priority and connects with the WAP 102a from the plurality of WAPs 102. Further, after a certain period of time due to a network overloading, the WAP 102a provides a poor connectivity to the electronic device 100. In response to determining the data speed of the WAP 102a, the electronic device 100 can determine that the user is playing online game and it require high speed wireless connection, the electronic device 100 dynamically selects the 4G LTE network by overriding the WAP policy.

Figure 3:
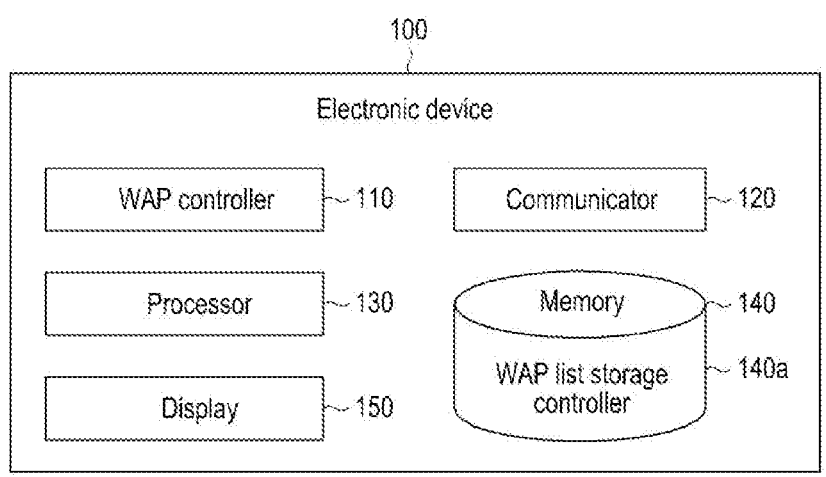
FIG. 3 illustrates various hardware components of the electronic device for managing the wireless connection, according to an embodiment of the present disclosure.

FIG. 3 illustrates various hardware components of the electronic device 100 for managing the wireless connection, according to an embodiment of the present disclosure. In an embodiment of the present disclosure, the electronic device 100 includes a WAP controller 110, a communicator 120, a processor 130, a memory 140 includes a WAP storage controller 140a and display 150.

In an embodiment of the present disclosure, the WAP controller 110 can be configured to detect the plurality of WAPs 102. The plurality of WAPs 102 enables the electronic device 100 to connect and communicate with the network 200, where each WAP 102 can have a specific frequency band which it operates in the network 200.

In an embodiment of the present disclosure, the WAP controller 110 can be configured to determine the current state of the electronic device 100. Based on the current state of the electronic device 100, the WAP controller 110 can be configured to select the WAP 102a from the plurality of WAPs 102.

In an embodiment of the present disclosure, the WAP controller 110 can be configured to obtain the priority data associated with each of the WAPs from the server. Further, the WAP controller 110 determines the new priority data for each of the WAPs based on the current state of the electronic device 100 and the current network conditions. In an embodiment of the present disclosure, the WAP list storage controller 140a is configured to store the priority list for each WAP from the plurality of WAPs 102.

In an embodiment of the present disclosure, the WAP controller 110 can be configured to dynamically determine the WAP 102a from the plurality of WAPs 102 based on the current state of the electronic device 100 and the new priority data associated with each of the WAPs. In response to the determination, the WAP controller 110 of the electronic device 100 can be configured to automatically establish the wireless connection with the WAP 102a.

In another embodiment of the present disclosure, the WAP controller 110 can be configured to determine the conflict among the plurality of WAP policies to connect to the WAP 102a from the plurality of WAPs 102. In an embodiment of the present disclosure, the plurality of WAP policies includes an electronic device-defined policy, a server-defined policy, and an operator defined policy. The electronic device-defined policy is a client-side policy. For example, the client-side policy can be Google Qualified Network Selector (QNS) and Samsung Smart Network Switch (SNS). The server-defined policy is an ANDSF policy.

Further, if there exists the conflict among the plurality of WAP policies to connect to the WAP from the plurality of WAPs 102 then, the WAP controller 110 can be configured to determine the current state of the electronic device 100. Further, the WAP controller 110 can be configured to dynamically determine the WAP 102a from the plurality of WAPs 102 based on the current state of the electronic device 100 and the new priority data associated with each of the WAPs. Furthermore, the WAP controller 110 of the electronic device 100 can be configured to dynamically establish the wireless connection with the WAP 102a from the plurality of WAPs 102.

In an embodiment of the present disclosure, the WAP controller 110 can be configured to resolve the conflicts between the QNS and the SNS of the electronic device-defined policy. Based on the determination of the current state of the electronic device 100 and the priority data, the WAP controller 110 can be configured select the WAP 102a from the plurality of WAPs 102.

In another embodiment of the present disclosure, the WAP controller 110 can be configured to determine the WAP policy to connect to the first WAP 102a from the plurality of WAPs 102. Further, the WAP controller 110 can be configured to determine the current state of the electronic device 100. Further, the WAP controller 110 can be configured to dynamically determine the second WAP 102b from the plurality of WAPs 102 based on the current state of the electronic device 100 and the new priority data associated with each of the WAPs. The second WAP from the plurality of WAPs 102 is determined by overriding the WAP policy. Furthermore, the WAP controller 110 can be configured to automatically establish the wireless connection with the second WAP.

Once the WAP controller 110 establishes the wireless connection with the WAP 102a, it will continuously or periodically determine a performance the WAP 102a for ensuring the good wireless connection with the network 200. The WAP controller 110 can be configured to determine whether the data speed of the WAP 102a meets the threshold criteria. If the data speed of the WAP 102a meets the threshold criteria then, the WAP controller 110 can be configured to continue connect with the WAP 102a.

If the data speed of the WAP 102a does not meet a threshold criteria then, the WAP controller 110 can be configured to again determine the current state of the electronic device 100. Further, the WAP controller 110 can be configured to dynamically determine other WAP 102b from the plurality of WAPs 102 based on the current state of the electronic device 100. Furthermore, the WAP controller 110 of the electronic device 100 can be configured to dynamically establish the wireless connection with the other WAP 102b from the plurality of WAPs 102 in response to determining that the data speed of the WAP 102a does not meet the threshold criteria.

The communicator 120 is configured to communicate internally between hardware components in the electronic device 100. The processor 130 is coupled with the memory 140 for processing various instructions stored in the memory 140 to manage wireless connection in the electronic device 100.

The memory 140 can be configured to store the instructions to be executed by the processor 130. The memory 140 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. In addition, the memory 140 can, in various examples, be considered a non-transitory storage medium. The term "non-transitory" can indicate that the storage medium is not embodied in a carrier wave or a propagated signal. However, the term "non-transitory" should not be interpreted that the memory 140 is non-movable. In various examples, the memory 140 can be configured to store larger amounts of information than the memory. In certain examples, a non-transitory storage medium can store data that can, over time, change (e.g., in Random Access Memory (RAM) or cache).

In an embodiment of the present disclosure, the display 150 can be configured to display a content in the electronic device 100. The display 150 can be, for example, but not limited to a Liquid Crystal Display (LCD), an Active Matrix Organic Light Emitting Diode (AM-OLED) display, a Light Emitting Diode (LED) display, or the like.

Although the FIG. 3 shows various hardware components of the electronic device 100 but it is to be understood that other embodiments are not limited thereon. In other embodiments of the present disclosure, the electronic device 100 can include less or more number of components. Further, the labels or names of the components are used only for illustrative purpose and does not limit the scope of the invention. One or more components can be combined together to perform same or substantially similar function of managing wireless connection in the electronic device 100.

Figure 4:
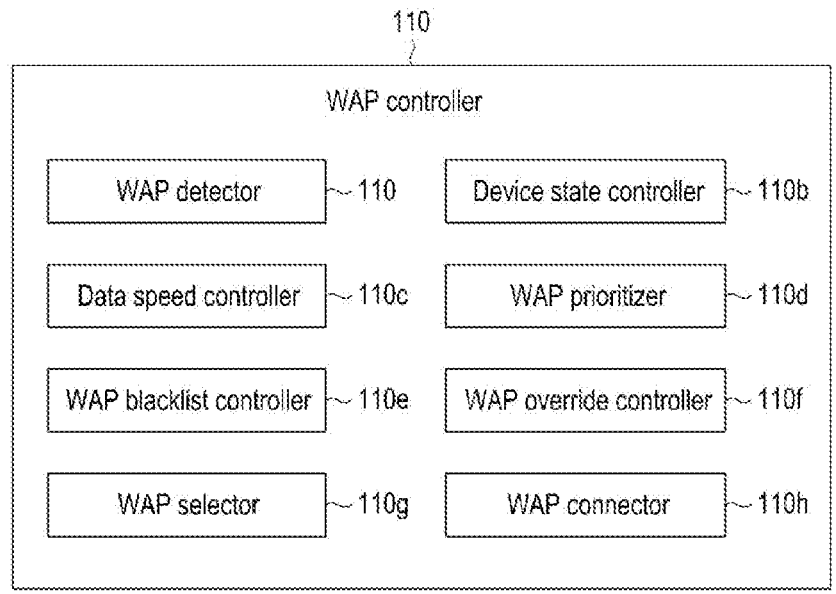
FIG. 4 illustrates various hardware components of a WAP controller of the electronic device for managing the wireless connection, according to an embodiment of the present disclosure.

FIG. 4 illustrates various hardware components of the WAP controller 110 of the electronic device 100 for managing the wireless connection, according to an embodiment of the present disclosure. In an embodiment of the present disclosure, the WAP controller 110 includes a WAP detector 110a, a device state controller 110b, a data speed controller 110c, a WAP prioritiser 110d, a WAP blacklist controller 110e, WAP override controller 110f, a WAP selector 110g and a WAP connector 110h.

In an embodiment of the present disclosure, the WAP detector 110a can be configured to detect the plurality of WAPs 102. The plurality of WAPs 102 enables the electronic device 100 to connect and communicate with the network 200, where each WAP 102a specifies a frequency band which it operates.

In an embodiment of the present disclosure, the device state controller 110b can be configured to determine the current state of the electronic device 100. In an embodiment of the present disclosure, the WAP prioritiser 110d can be configured to obtain the priority data associated with each of the WAPs from the server. Further, the WAP prioritiser 110d determines the new priority data for each of the WAPs based on the current state of the electronic device 100 and the current network conditions.

In an embodiment of the present disclosure, the WAP selector 110g can be configured to dynamically determine the WAP 102a from the plurality of WAPs 102 based on the current state of the electronic device 100 and the new priority data associated with each of the WAPs. In response to the determination, the WAP connector 110h of the electronic device 100 can be configured to automatically establish the wireless connection with the WAP 102a.

In another embodiment of the present disclosure, the device state controller 110b can be configured to determine the conflict among the plurality of WAP policies to connect to the WAP 102a from the plurality of WAPs 102. In an embodiment of the present disclosure, the plurality of WAP policies includes the electronic device-defined policy, the server-defined policy, and the operator defined policy.

Further, if there exists the conflict among the plurality of WAP policies to connect to the WAP 102a from the plurality of WAPs 102 then, the device state controller 110b can be configured to determine the current state of the electronic device 100. Further, the WAP selector 110g can be configured to dynamically determine the WAP 102a from the plurality of WAPs 102 based on the current state of the electronic device 100 and the new priority data associated with each of the WAPs. Furthermore, the WAP connector 110h of the electronic device 100 can be configured to dynamically establish the wireless connection with the WAP 102a from the plurality of WAPs 102.

In an embodiment of the present disclosure, if the user preference is given to a third party WAP then, the WAP selector 110g can be configured to decide to connect with the third party WAP, which can be a compromised WAP/a Rogue WAP. Further, the WAP blacklist controller 110e can be configured to determine whether the WAP 102a is a compromised WAP/a Rogue WAP. The compromised/rogue WAP access point is the WAP which that is installed on the network 200 without explicit authorization from a network administrator, and serves as a malicious attacker. Consider the WAP 102a is the Rogue WAP then, the WAP blacklist controller 110e is configured to perform a blacklist action on the WAP 102a. This results in ensuring a reliable wireless connection with the WAP 102a. Further, the ANDSF server can take precedence over electronic device-defined policy and the WAP selector 110g can be configured to select the other WAP 102b.

In an embodiment of the present disclosure, the WAP selector 110g can be configured to determine the WAP policy to connect to the first WAP 102a from the plurality of WAPs 102. Further, the device state controller 110b can be configured to determine the current state of the electronic device 100. Further, the WAP selector 110g can be configured to dynamically determine the second WAP 102b from the plurality of WAPs 102 based on the current state of the electronic device 100 and the new priority data associated with each of the WAPs. The WAP override controller 110f is configured to select the second WAP 102b from the plurality of WAPs 102 is determined by overriding the WAP policy. Furthermore, the WAP connector 110h can be configured to automatically establish the wireless connection with the second WAP 102b.

Further, the data speed controller 110c can be configured to determine whether the data speed of the WAP 102a meets the threshold criteria continuously or periodically. If the data speed of the WAP 102a meets the threshold criteria then, the WAP connector 110h can be configured to continue connect with the WAP 102a.

If the data speed of the WAP 102a does not meet a threshold criteria then, the device state controller 110b can be configured to again determine the current state of the electronic device 100. Further, the WAP detector 110a can be configured to dynamically determine other WAP 102b from the plurality of WAPs 102 based on the current state of the electronic device 100 and the priority data associated with each of the WAPs. Furthermore, the WAP connector 110h can be configured to dynamically establish the wireless connection with the other WAP 102b from the plurality of WAPs 102 in response to determining that the data speed of the WAP 102a does not meet the threshold criteria.

Although the FIG. 4 shows various hardware components of the WAP controller 110 but it is to be understood that other embodiments are not limited thereon. In other embodiments of the present disclosure, the WAP controller 110 can include less or more number of components. Further, the labels or names of the components are used only for illustrative purpose and does not limit the scope of the invention. One or more components can be combined together to perform same or substantially similar function of managing wireless connection in the electronic device 100.

Figure 5:
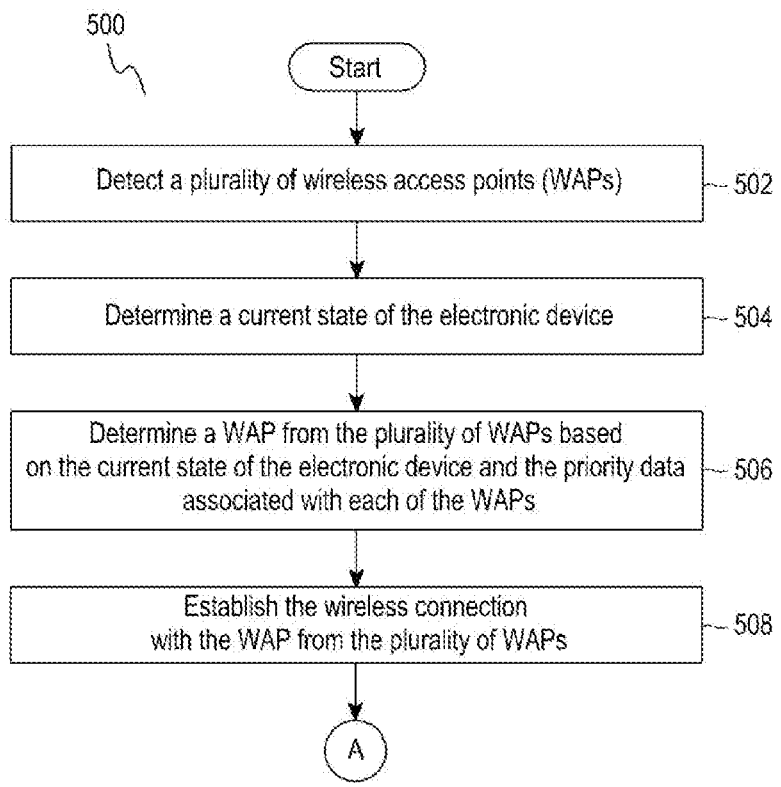
FIG. 5 is a flow diagram illustrating various operations for managing the wireless connection in the electronic device, according to an embodiment of the present disclosure.

FIG. 5 is a flow diagram 500 illustrating various operations for managing the wireless connection in the electronic device 100, according to an embodiment of the present disclosure.

At operation 502, the method includes detecting the plurality of WAPs 102. In an embodiment of the present disclosure, the method allows the WAP detector 110a to detect the plurality of WAPs 102. For example, the plurality of WAPs 102 can be triggered from the server.

At operation 504, the method includes determining the current state of the electronic device 100. In an embodiment of the present disclosure, the method allows the current state detector 110b to determine the current state of the electronic device 100. For example, if the current state of the electronic device 100 indicates the battery usage information of the electronic device 100.

Based on the current state of the electronic device 100 and the priority data associated with each of the WAPs, at operation 506, the method includes dynamically determining the WAP 102a from the plurality of WAPs 102 based on the battery usage information. In an embodiment of the present disclosure, the method allows the WAP selector 110g to dynamically determine the WAP 102a from the plurality of WAPs 102 based on the current state of the electronic device 100 and the priority data associated with each of the WAPs.

Further, at operation 508, the method includes automatically establishing the wireless connection with the WAP 102a from the plurality of WAPs 102. In an embodiment of the present disclosure, the method allows the WAP connector 110h to automatically establish the wireless connection with the WAP 102a from the plurality of WAPs 102.

The various actions, acts, blocks, steps, or the like in the flow diagram 500 can be performed in the order presented, in a different order or simultaneously. Further, in some embodiments, some of the actions, acts, blocks, steps, or the like can be omitted, added, modified, skipped, or the like without departing from the scope of the invention.

Figure 6:
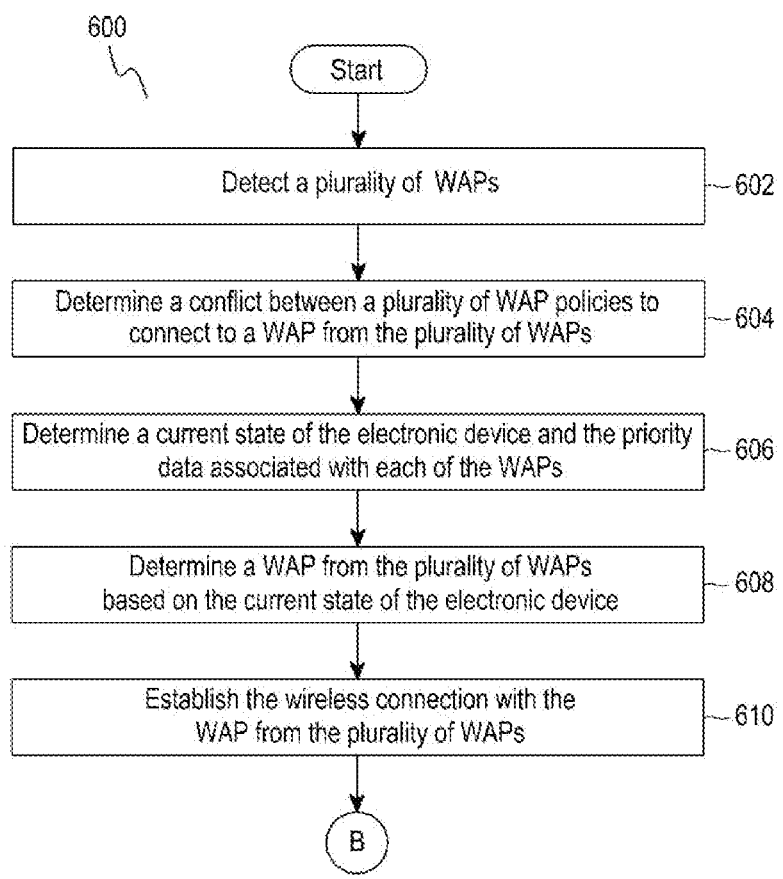
FIG. 6 is a flow diagram illustrating various operations for managing the wireless connection in the electronic device, according to an embodiment of the present disclosure.

FIG. 6 is a flow diagram 600 illustrating various operations for managing the wireless connection in the electronic device 100, according to an embodiment of the present disclosure.

At operation 602, the method includes detecting the plurality of WAPs 102. In an embodiment of the present disclosure, the method allows the WAP detector 110a to detect the plurality of WAPs 102.

At operation 604, the method includes determining a conflict among the plurality of WAP policies to connect to the WAP 102a from the plurality of WAPs 102. For example, both the server side policy (e.g., ANDSF) and the electronic device-side policy (e.g., SNS, DNS) are steered at the electronic device 100.

At operation 606, the method includes determining the current state of the electronic device 100. In an embodiment of the present disclosure, the method allows the current state detector 110b to determine the current state of the electronic device 100. For example, if the current state of the electronic device 100 indicates that the user is playing online games.

Based on the current state of the electronic device and the priority data associated with each of the WAPs, at operation 608, the method includes dynamically determining the WAP 102a from the plurality of WAPs 102. In an embodiment of the present disclosure, the method allows the WAP selector 110g to dynamically determine the WAP 102a from the plurality of WAPs 102 based on the current state of the electronic device 100 and the priority data associated with each of the WAPs. For example, as the user is playing online games, the electronic device 100 is configured to choose a faster WAP from the plurality of WAPs 102.

Further, at operation 610, the method includes automatically establishing the wireless connection with the WAP 102a from the plurality of WAPs 102. In an embodiment of the present disclosure, the method allows the WAP connector 110h to automatically establish the wireless connection with the WAP 102a from the plurality of WAPs 102.

The various actions, acts, blocks, steps, or the like in the flow diagram 600 can be performed in the order presented, in a different order or simultaneously. Further, in some embodiments, some of the actions, acts, blocks, steps, or the like can be omitted, added, modified, skipped, or the like without departing from the scope of the invention.

Figure 7:
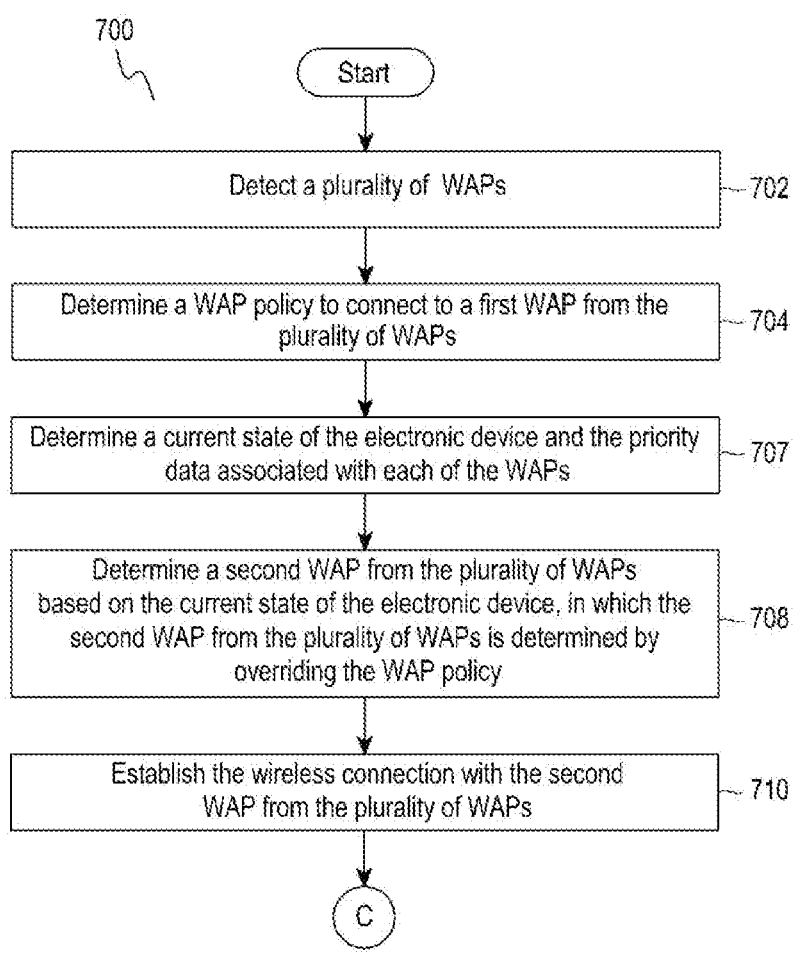
FIG. 7 is a flow diagram illustrating various operations for managing the wireless connection in the electronic device, according to an embodiment of the present disclosure.

FIG. 7 is a flow diagram 700 illustrating various operations for managing the wireless connection in the electronic device 100, according to an embodiment of the present disclosure.

At operation 702, the method includes detecting the plurality of WAPs 102. In an embodiment of the present disclosure, the method allows the WAP detector 110a to detect the plurality of WAPs 102.

At operation 704, the method includes determining the WAP policy to connect to the first WAP 102a from the plurality of WAPs 102. In an embodiment of the present disclosure, the method allows the WAP selector 110g to determine the WAP policy to connect to the first WAP 102a from the plurality of WAPs 102.

At operation 706, the method includes determining the current state of the electronic device 100. In an embodiment of the present disclosure, the method allows the current state detector 110b to determine the current state of the electronic device 100. For example, if the current state of the electronic device 100 indicates that the user performs normal browsing.

Based on the current state of the electronic device, at operation 708, the method includes dynamically determining the second WAP 102b from the plurality of WAPs 102, where the second WAP 102b from the plurality of WAPs 102 is determined by overriding the WAP policy. In an embodiment of the present disclosure, the method allows the WAP selector 110g to dynamically determine the second WAP 102b from the plurality of WAPs 102 based on the current state of the electronic device 100 and the priority data associated with each of the WAPs. For example, as the user is performing normal browsing, the electronic device 100 is configured to choose a little slower WAP from the plurality of WAPs 102.

Further, at operation 710, the method includes automatically establishing the wireless connection with the WAP 102a from the plurality of WAPs 102. In an embodiment of the present disclosure, the method allows the WAP connector 110h to automatically establish the wireless connection with the WAP 102a from the plurality of WAPs 102.

The various actions, acts, blocks, steps, or the like in the flow diagram 700 can be performed in the order presented, in a different order or simultaneously. Further, in some embodiments, some of the actions, acts, blocks, steps, or the like can be omitted, added, modified, skipped, or the like without departing from the scope of the invention.

Figure 8:
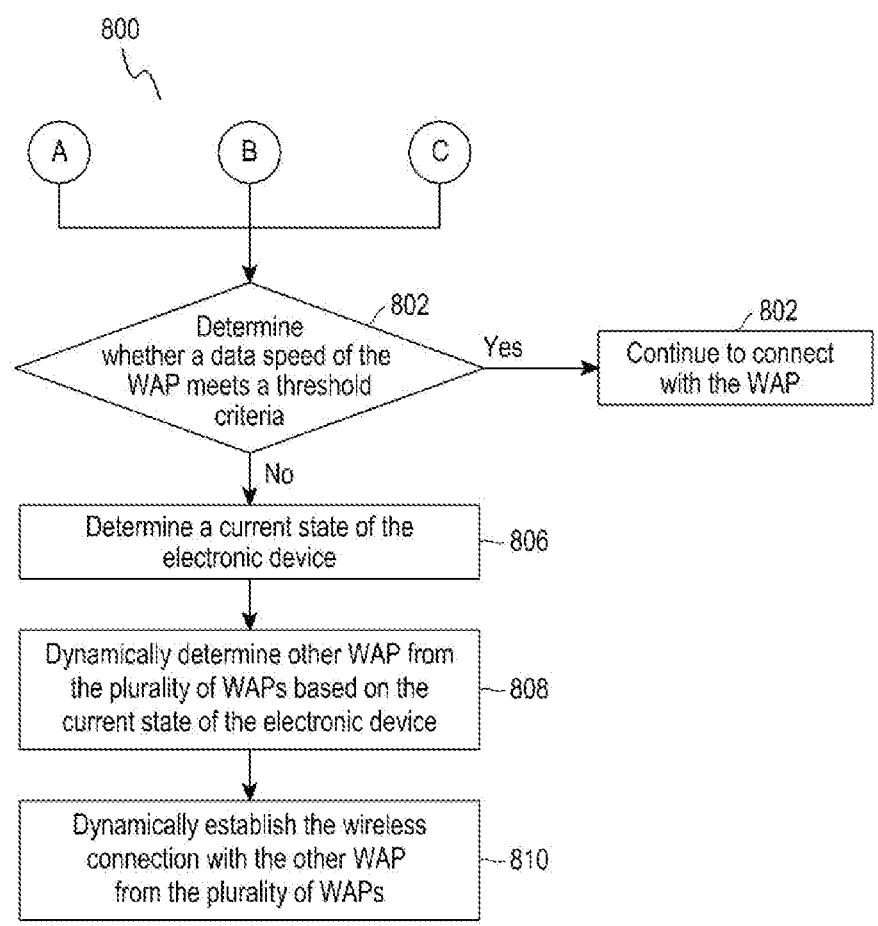
FIG. 8 is a flow diagram illustrating various operations for establishing the wireless connection with the WAP based on a current state of the electronic device, according to an embodiment of the present disclosure.

FIG. 8 is a flow diagram 800 illustrating various operations for establishing the wireless connection with the WAP 102a based on the current state of the electronic device 100, according to an embodiment of the present disclosure.

After establishing the wireless connection with the WAP 102a, at operation 802, the method includes determining whether the data speed of the WAP 102a meets the threshold criteria. In an embodiment of the present disclosure, the method allows the data speed controller 110c configured to determine whether the data speed of the WAP 102a meets the threshold criteria. If the data speed of the WAP 102a meets the threshold criteria then at operation 804, the WAP connector 100h can continue connect with the WAP 102a.

If the data speed of the WAP does not meet the threshold criteria then at operation 806, the method includes determining the current state of the electronic device 100. In an embodiment of the present disclosure, the method allows the device state controller 110b to determine the current state of the electronic device 100.

At operation 808, the method includes determining the other WAP 102b from the plurality of WAPs 102 based on the current state of the electronic device 100. In an embodiment of the present disclosure, the method allows the WAP selector 110g to determine the other WAP 102b from the plurality of WAPs 102 based on the current state of the electronic device 100.

At operation 810, the method includes dynamically establishing the wireless connection with the other WAP 102b from the plurality of WAPs 102. In an embodiment of the present disclosure, the method allows the WAP connector 110h to dynamically establish the wireless connection with the other WAP 102b from the plurality of WAPs 102.

The various actions, acts, blocks, steps, or the like in the flow diagram 800 can be performed in the order presented, in a different order or simultaneously. Further, in some embodiments, some of the actions, acts, blocks, steps, or the like can be omitted, added, modified, skipped, or the like without departing from the scope of the invention.

Figure 9:
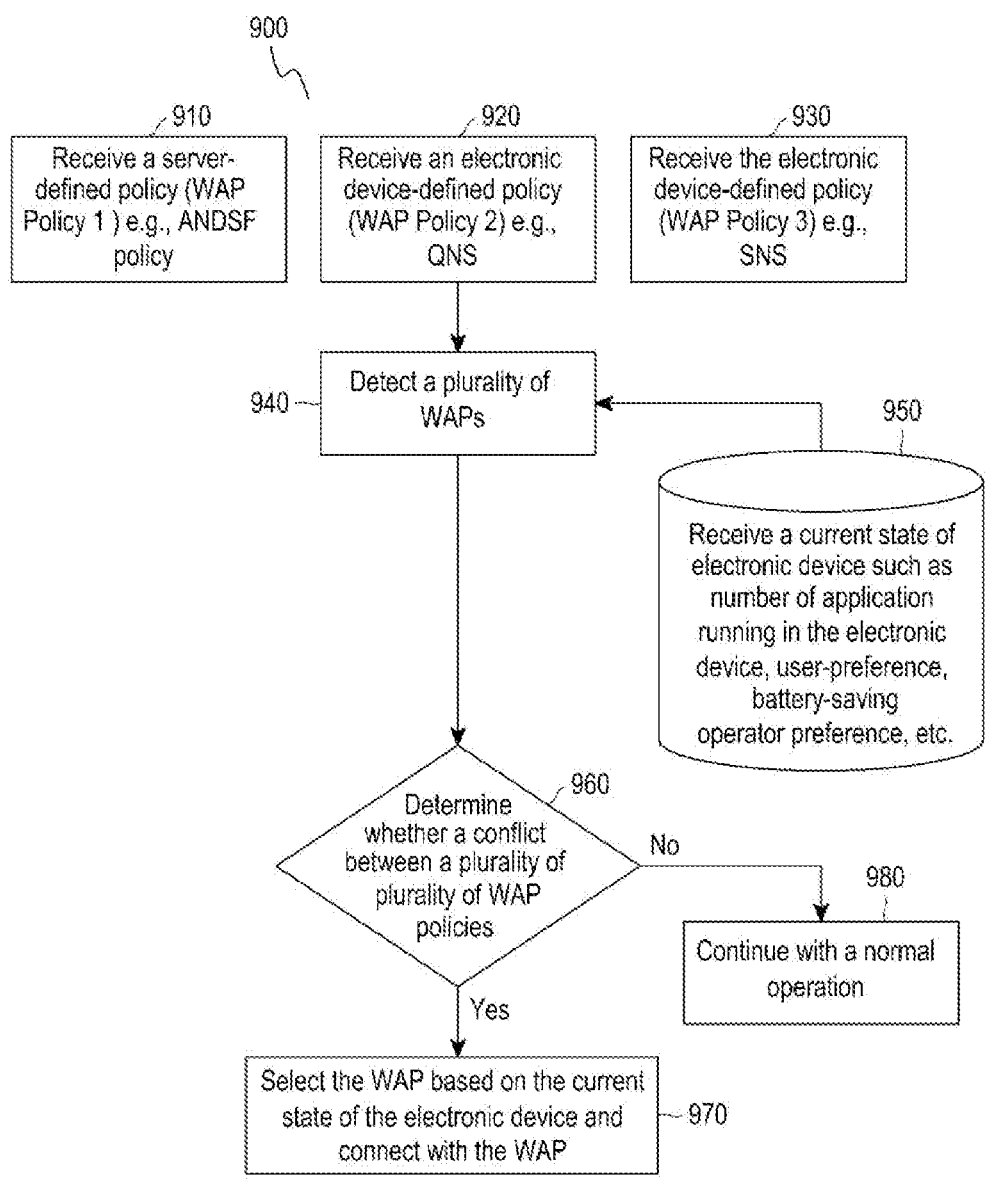
FIG. 9 is a flow diagram illustrating various operations for establishing the wireless connection with the WAP based on the current state of the electronic device, according to an embodiment of the present disclosure.

FIG. 9 is a flow diagram 900 illustrating various operations for establishing the wireless connection with the WAP 102a based on the current state of the electronic device 100, according to an embodiment of the present disclosure. The electronic device 100 receives the WAP policy from plurality of WAP policy providers and select the WAP 102a based on the current state of the electronic device 100.

At operation 910, the method includes receiving the server-defined policy such as e.g., ANDSF policy from WAP policy provider 1. In an embodiment of the present disclosure, the method includes the WAP detector 110a to receive the server-defined policy such as e.g., ANDSF policy from a WAP policy provider 1. At operation 920, the method includes receiving the electronic device-defined policy such as QNS policy from a WAP policy provider 2. In an embodiment of the present disclosure, the method includes the WAP detector 110a to receive the electronic device-defined policy such as QNS policy from WAP policy provider 2. At operation 930, the method includes receiving the electronic device-defined policy such as SNS policy from a WAP policy provider 3. In an embodiment of the present disclosure, the method includes the WAP detector 110a to receive the electronic device-defined policy such as SNS policy from WAP policy provider 3.

At operation 940, the method includes detecting the plurality of WAPs 102. In an embodiment of the present disclosure, the method allows the WAP detector 110a to detect the plurality of WAPs 102. Further, at operation 950, the method includes receiving the current state of electronic device 100 for e.g., the number of applications running in the electronic device 100, user-preference, battery-saving, operator preference, etc. In an embodiment of the present disclosure, the method allows the device state controller 110b to detect the current state of electronic device 100.

At operation 960, the method includes determining whether there is the conflict among the plurality of WAP policies. In an embodiment of the present disclosure, the method allows the WAP controller 110 to determine whether there is the conflict among the plurality of WAP policies. The WAP controller 110 determines that the plurality of WAP policies are steered at the same time and there causes the conflict in the WAP selection.

If there exists a conflict among the plurality of WAP policies, at operation 970, the method includes selecting the WAP 102a based on the current state of the electronic device 100. In an embodiment of the present disclosure, the method allows the WAP controller 110 to select the WAP 102a based on the current state of the electronic device 100. Further, the WAP controller 110 connects with the WAP 102a in response to the selection of the WAP 102a. For example, consider if the current state of the electronic device 100 indicates that the predefined network setting as the operator preference then, the WAP controller 110 connects with the WAP 102a based on the instruction from the operator.

If there is no conflict among the plurality of WAP policies, at operation 980, the method includes continue with a normal operation. The WAP controller 110 configured to connect with the WAP 102a based on the priority data associated with each of the WAPs.

The various actions, acts, blocks, steps, or the like in the flow diagram 900 can be performed in the order presented, in a different order or simultaneously. Further, in some embodiments, some of the actions, acts, blocks, steps, or the like can be omitted, added, modified, skipped, or the like without departing from the scope of the invention.

Figure 10A:
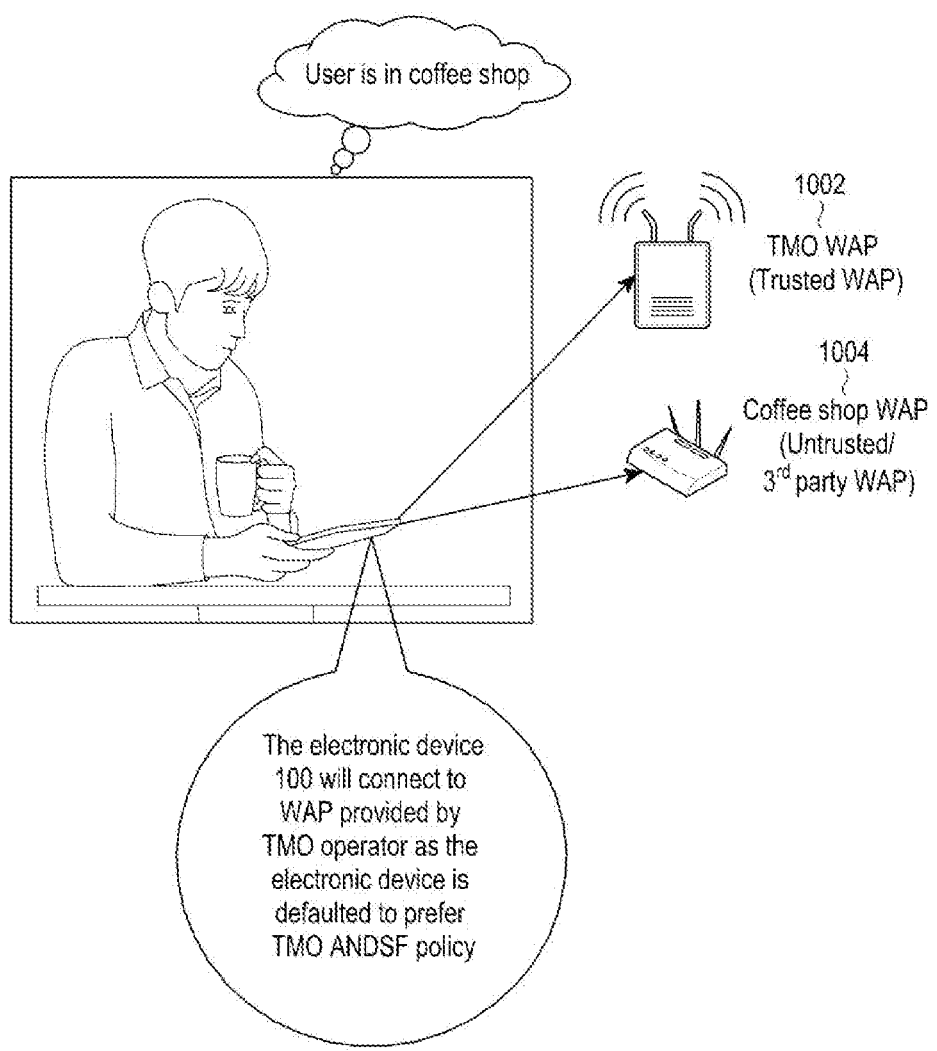
FIG. 10A is an example scenario in which the electronic device establishes the wireless connection with the WAP based on a preferred network setting, according to a prior art.

FIG. 10A is an example scenario in which the electronic device 100 establishes the wireless connection with the WAP based on a preferred network setting, according to a prior art.

Consider a scenario in which the user is located in a coffee shop, which has a free WAP (i.e., coffee shop WAP 1004) of its own (5 Mbps for normal and 40 Mbps for premium member Data limit is 2 GB per day per user) and the user is the premium member in the coffee shop. Further, there is one operator such as TMO having a TMO WAP 1002 (8 Megabits of data per second (Mbps), unlimited data) which has a coverage in coffee shop location, where the user is having TMO operator and also subscribed to TMO ANDSF plan. As shown in the FIG. 10A, there are two WAPs in the coffee shop such as the TMO WAP 1002 which is trusted WAP and coffee shop WAP 1004 which is an untrusted/third party WAP. The trusted WAPs are hosted by the operator/subscriber (herein, the T-mobile operator hosted the TMO WAP), whereas the untrusted WAPs are hosted by the 3rd party providers (herein, coffee shop).

Let the user is viewing a video content on the electronic device 100, and the electronic device 100 requires large data to view the video content without any buffering. The electronic device 100 now has options to connect with the both the WAPs. Consider if the electronic device 100 is defaulted to prefer the server-defined policy such as ANDSF policy then, the electronic device 100 connects with the TMO WAP 1002. The electronic device 100 will connect to WAP provided by the TMO as the electronic device 100 is defaulted to prefer TMO ANDSF policy as shown in the FIG. 10A. However, due to poor coverage, the video content can take time to load in the electronic device 100 and results in buffering of the video content which creates an unsatisfied browsing experience for the user, even the user is the premium member of the coffee shop, the electronic device 100 does not connect with the coffee shop WAP 1004 due to preference defined in the electronic device 100.

Figure 10B:
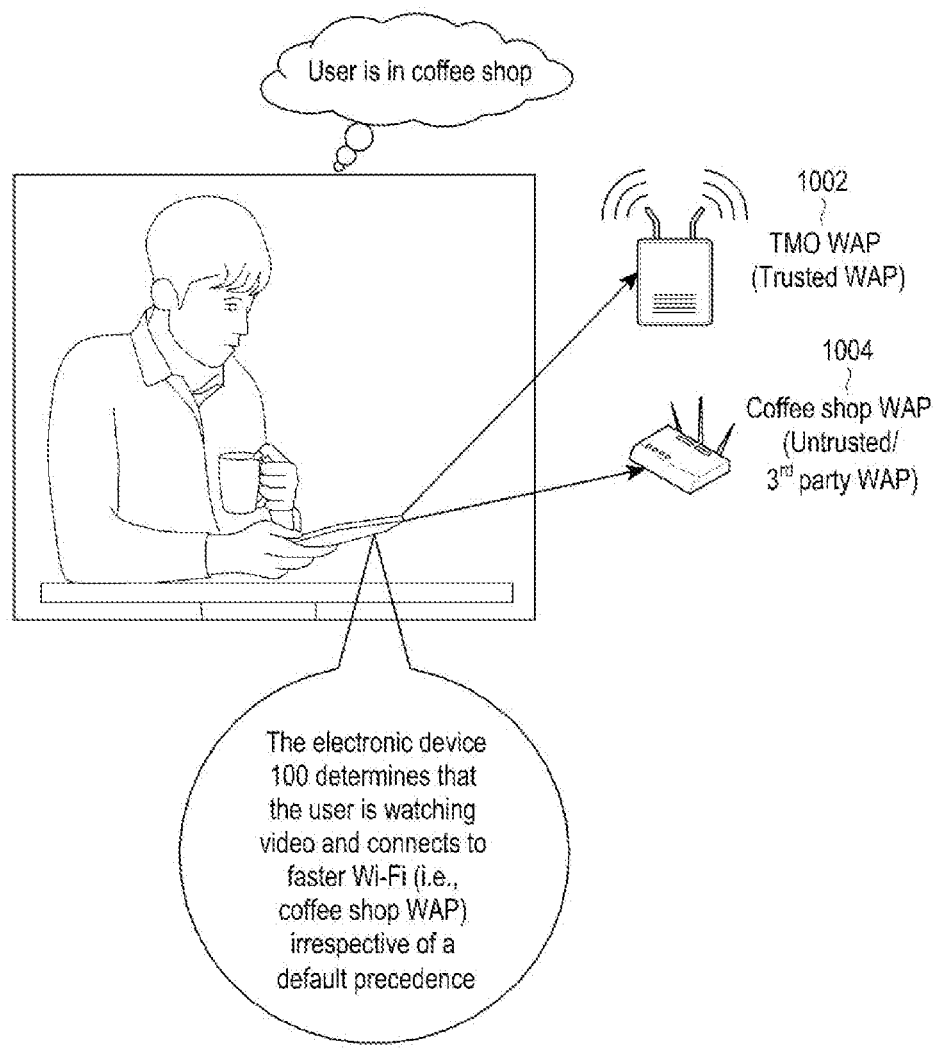
FIG. 10B is an example scenario in which the electronic device establishes the wireless connection with the WAP based on a type of application running in a foreground of the electronic device, according to an embodiment of the present disclosure.

FIG. 10B is an example scenario in which the electronic device 100 establishes the wireless connection with the WAP based on the type of applications running in the foreground of the electronic device 100, according to an embodiment of the present disclosure.

In conjunction with the FIG. 10A, let the user is viewing a video content on the electronic device 100, and the electronic device 100 requires large data to view the video content without any buffering. The electronic device 100 now has both options to connect with the WAP. Let the electronic device 100 is defaulted to prefer the server-defined policy.

In an embodiment of the present disclosure, the electronic device 100 determines the current state such as the user is watching the video content. Further, video content requires the large data then, the electronic device 100 dynamically determines whether there is any high-speed WAP in the coffee shop location. Further, the electronic device 100 detects that the coffee shop has one WAP which provides high-speed data to the user and also user is a premium member at the coffee shop. Based on the determination, the electronic device 100 connects to the coffee shop WAP 1004 which is faster, irrespective of the precedence set in the electronic device 100. Hence this results in a dynamic control of WAP selection based on the current state of the electronic device 100.

Figure 11A:
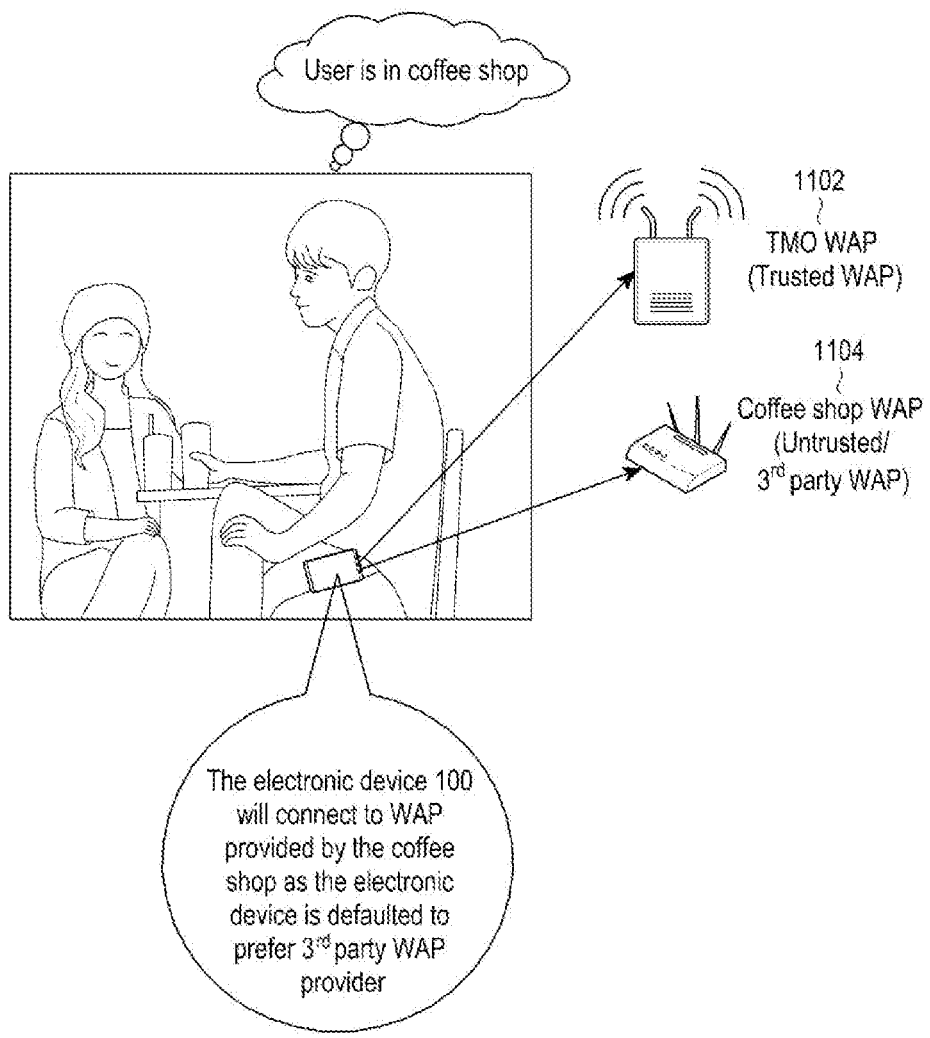
FIG. 11A is an example scenario in which the electronic device establishes the wireless connection with the WAP based on the preferred network setting, according to a prior art.

FIG. 11A is an example scenario in which the electronic device 100 establishes the wireless connection with the WAP based on the preferred network setting, according to a prior art.

Consider a scenario in which the user is located in a coffee shop, which has a free WAP (i.e., coffee shop WAP 1004) of its own (5 Mbps for normal and 40 Mbps for premium member Data limit is 2 GB per day per user) and the user is the premium member in the coffee shop. Further, there is one operator such as TMO having a TMO WAP 1002 (8 Megabits of data per second (Mbps), unlimited data) which has a coverage in coffee shop location, where the user is having TMO operator and also subscribed to TMO ANDSF plan. As shown in the FIG. 11A, there are two WAPs in the coffee shop such as TMO WAP 1102 which is trusted WAP and coffee shop WAP 1104 which is an untrusted/third party WAP.

Let the electronic device 100 is defaulted to prefer the third party WAP. The electronic device 100 detects for the third party WAP and finds the coffee shop WAP 1104, where the user has a data limit of 1 GB data per day in the coffee shop, as per the membership plan. As shown in the FIG. 11A, the user is chatting with a friend and kept his electronic device 100 in a pocket. Further, the electronic device 100 can be configured to connect with the coffee shop WAP 1104 as the defaulted preference is third party WAP. Further, all the applications in the user's electronic device start performing an update action using the coffee shop WAP 1104, which is high speed and a costlier WAP. Hence, the electronic device 100 connects with the coffee shop WAP 1104, even the user has an unlimited plan with the TMO WAP 1102. This results in wastage of costly premium data for updating the application in the background of the electronic device 100.

Figure 11B:
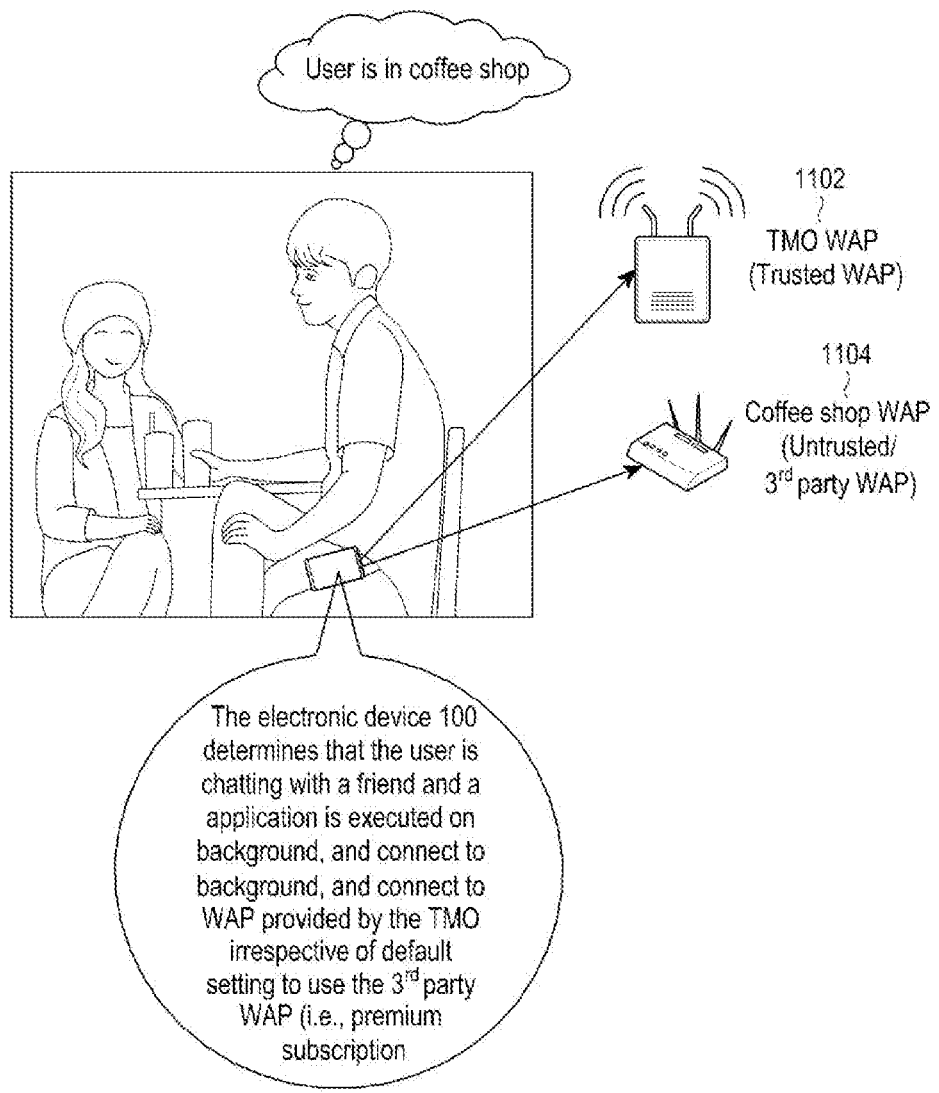
FIG. 11B is an example scenario in which the electronic device establishes the wireless connection with the WAP based on number of applications running in a background of the electronic device, according to an embodiment of the present disclosure

FIG. 11B is an example scenario in which the electronic device 100 establishes the wireless connection with the WAP based on the number of applications running in a background of the electronic device 100, according to an embodiment of the present disclosure.

In conjunction with the FIG. 11A, let the user is chatting with his friend and the applications in the electronic device 100 request for permission from the user to perform the update action. The electronic device 100 detects the two WAP in the coffee shop, such as such as TMO WAP 1102 which is the trusted WAP and coffee shop WAP 1104 which is the untrusted/third party WAP. In an embodiment of the present disclosure, the electronic device 100 is configured to determine the current state such as the update action is required for the application and it will run on the background of the electronic device 100 and the user is not executing any application in the foreground of the electronic device 100.

In an embodiment of the present disclosure, based on the determination, the electronic device 100 connects to the TMO WAP 1102 irrespective of the preferred network setting. The TMO WAP 1102 has the unlimited data plan for the user which is less costly compared to the coffee shop WAP 1104 and also the user is not executing any application in the foreground, the electronic device 100 intelligently uses the TMO WAP 1102 for the updating action. Hence this results in a dynamic control of WAP selection based on the current state of the electronic device 100.

Figure 12A:
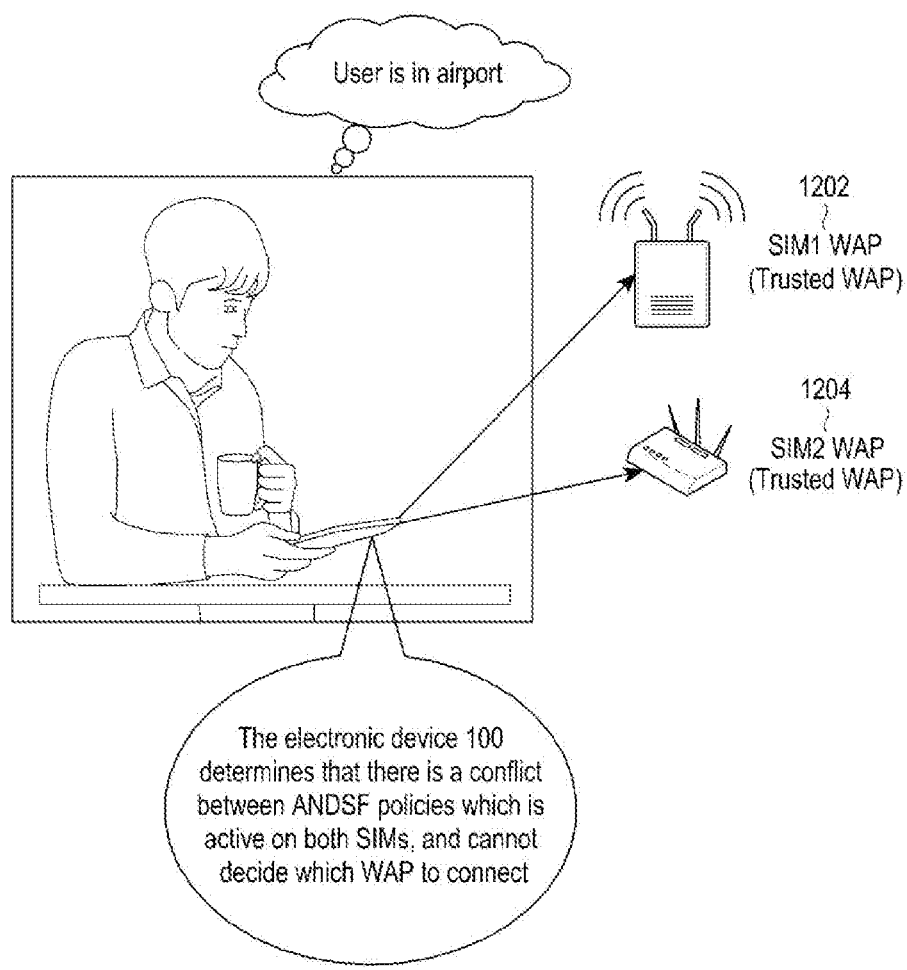
FIG. 12A is an example scenario in which the electronic device establishes the wireless connection with the WAP based on the preferred network setting, according to a prior art.

FIG. 12A is an example scenario in which the electronic device 100 establishes the wireless connection with the WAP based on the preferred network setting, according to a prior art.

Consider a scenario in which the user is located in an airport, and the user is having electronic device 100 with dual SIMs and both the SIMs are active, where the ANDSF policy is activated for both SIMs. Further, in the airport, the electronic device 100 detects two WAPs such as one WAP for SIM1 operator, i.e., SIM1 WAP 1202 (4 Mbps, unlimited data) and one WAP for SIM2 operator, i.e., SIM2 WAP 1204 (8 Mbps, 2 GB data limit per user). Both the WAPs are trusted WAP as they are hosted by the respective operators. Let the electronic device 100 is defaulted to prefer the ANDSF policy. The electronic device 100 is getting steering control instruction to connect with the WAP from both the WAPs. This causes a confusion in the electronic device 100 i.e., which WAP to connect with the network 200. This create a frustrated user experience as there exists a trouble in selecting the WAP.

Figure 12B:
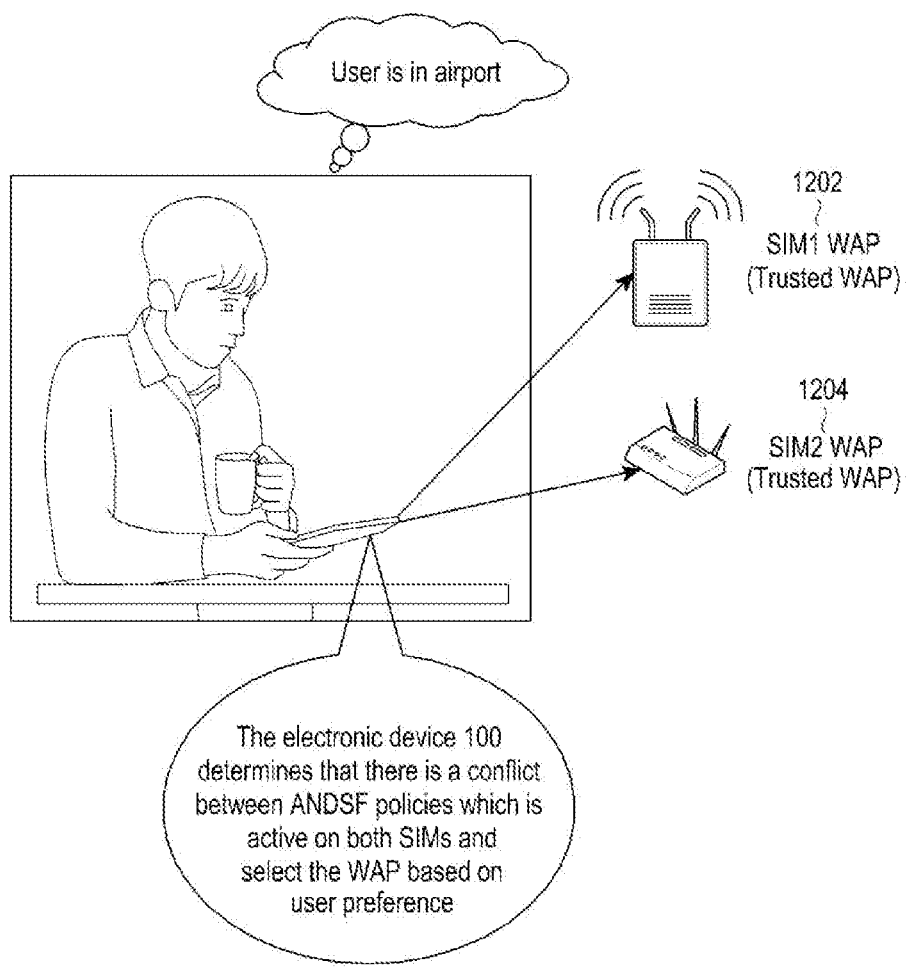
FIG. 12B is an example scenario in which the electronic device establishes the wireless connection with the WAP based on a user preference, according to an embodiment of the present disclosure.

FIG. 12B is an example scenario in which the electronic device 100 establishes the wireless connection with the WAP based on the user preference, according to an embodiment of the present disclosure.

In conjunction with the FIG. 12A, the electronic device 100 detects two WAPs such as one WAP for SIM1 operator, i.e., SIM1 WAP 1202 (4 Mbps, unlimited data) and one WAP for SIM2 operator, i.e., SIM2 WAP 1204 (8 Mbps, 2 GB data limit per user) in the airport location. In an embodiment of the present disclosure, the electronic device 100 determines that there exists the conflict between the SIM1 WAP 1202 and the SIM2 WAP 1204, as the ANDSF policy is activated on both the operators.

Further, the electronic device 100 determines the current state such as user preference defined in the electronic device 100. Further, the electronic device 100 select the WAP based on the user preference. If there is no predefined preference defined in the electronic device 100 then, the electronic device 100 dynamically chooses the faster WAP if any application is executed in the foreground of the electronic device 100 and chooses the slower WAP if the application is executed in the background of the electronic device 100. Hence, this results in resolving the conflict among the WAP policies and provide a better network connection for the user.

Figure 13:
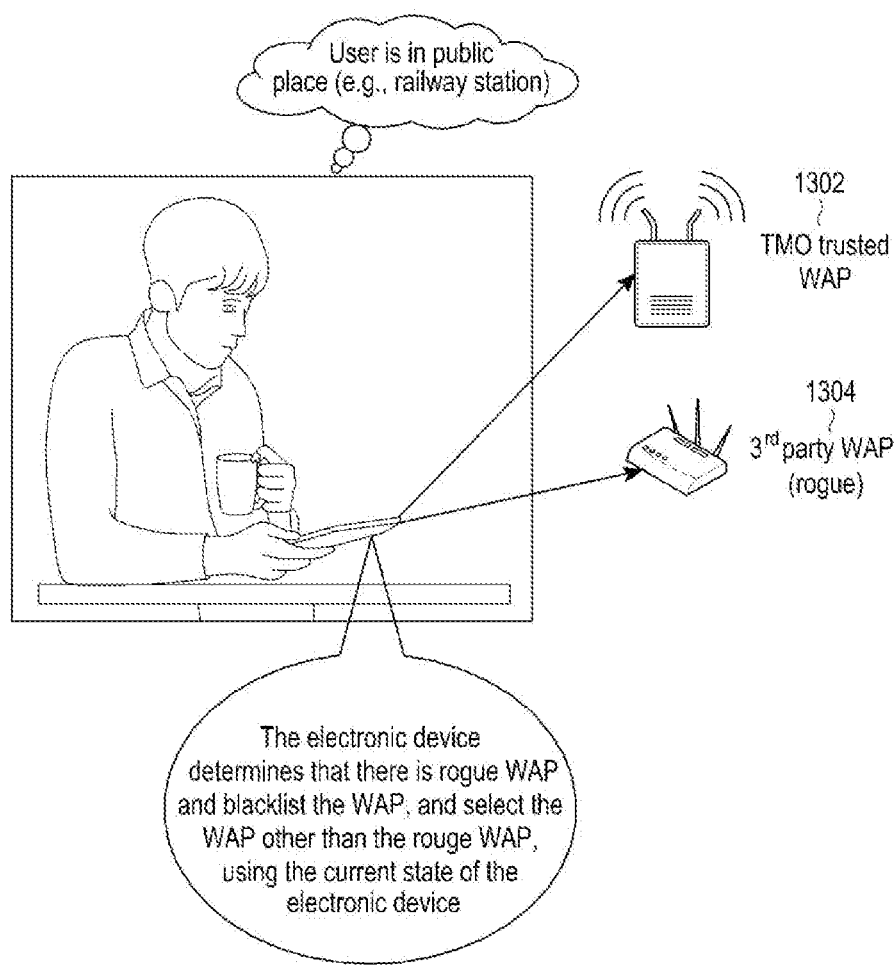
FIG. 13 is an example scenario in which the electronic device establishes the wireless connection with the WAP based on the current state of the electronic device, according to an embodiment of the present disclosure.

FIG. 13 is an example scenario in which the electronic device 100 establishes the wireless connection with the WAP based on the current state of the electronic device 100, according to an embodiment of the present disclosure.

Consider a scenario in which the user is located in a public place e.g., railway station, and the electronic device 100 detects one TMO WAP 1302 (4 Mbps, unlimited data) and one 3rd party WAP 1304 (40 Mbps, unlimited data). Let the 3rd party WAP 1304 is the rogue AP and it is configured to hack a data in the electronic device 100 whichever is connected with it. Further, the user is subscribed to the ANDSF policy and the predefined network setting of the electronic device 100 is configured to always choose the faster WAP via google QNS.

In general, the electronic device 100 receives ANDSF steering-control instructions to connect to the TMO WAP 1302, however the electronic device 100 decides to connect with the 3rd party WAP 1304 which is faster as per the QNS policy. This results in a data loss or a data theft, if the electronic device 100 connects with the 3rd party WAP 1304 (i.e., Rogue WAP).

In an embodiment of the present disclosure, the TMO operator of the electronic device 100 determines that the 3rd party WAP 1304 is the rogue AP, it can send a Red_Alert command to the electronic device 100 to blacklist the 3rd party WAP 1304. Even if the QNS policy suggest the 3rd party WAP 1304, the ANDSF policy take precedence to blacklist the 3rd party WAP and then the electronic device 100 connects with the TMO WAP 1302 (trusted WAP). This results in safeguarding the data in the electronic device 100 from the hackers such as 3rd party WAP 1304.

Figure 14:
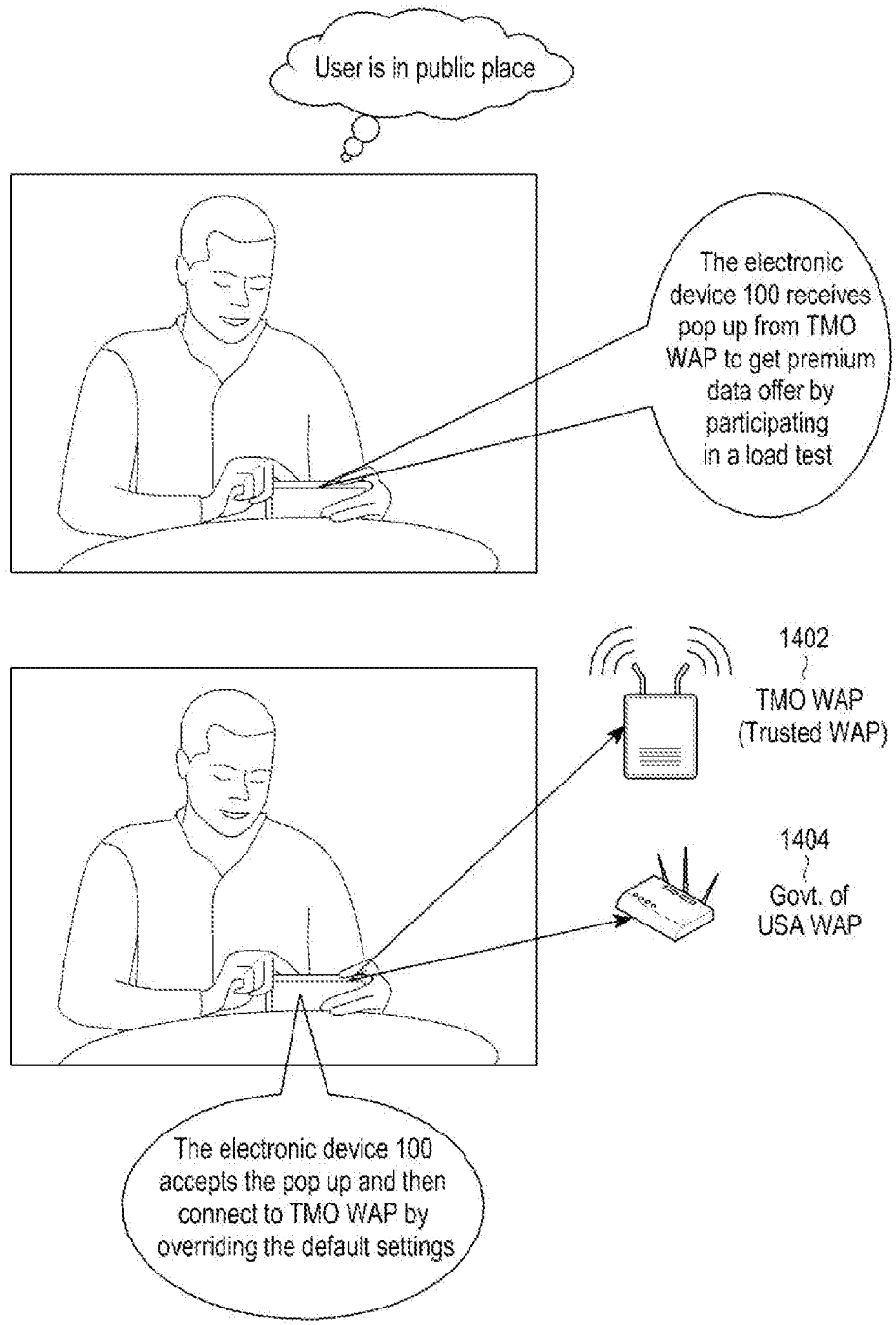
FIG. 14 is an example scenario in which the electronic device establishes the wireless connection with the WAP based on the current state of the electronic device, according to an embodiment of the present disclosure.

FIG. 14 is an example scenario in which the electronic device 100 establishes the wireless connection with the WAP based on the current state of the electronic device 100, according to an embodiment of the present disclosure.

Consider a scenario in which the user is located in a public place e.g., railway station, and the electronic device 100 detects one TMO WAP 1402 (4 Mbps, unlimited data) and one WAP (40 Mbps, unlimited data) by government of USA WAP 1404 in the railway station. Further, the user is subscribed to the ANDSF policy and the predefined network setting of the electronic device 100 is configured to always choose the faster WAP via google QNS. The electronic device 100 receives the priority data for each WAP 102a from the ANDSF policy. Consider a highest priority is given for Govt. of USA WAP 1404.

Let the TMO wishes to do a load test on its WAP using maximum number of users. The user receives a pop-up notification from the TMO WAP 1402 to get a premium data offer by participating in the load test. Based on the priority data and the current state of the electronic device 100, the electronic device 100 accepts the pop-up notification and performs the load test which provides a benefit to the user, such as premium data offer. The electronic device 100 can override the priority data provided by the ANDSF server and connect with the TMO WAP 1402 for better performance.

Figure 15:
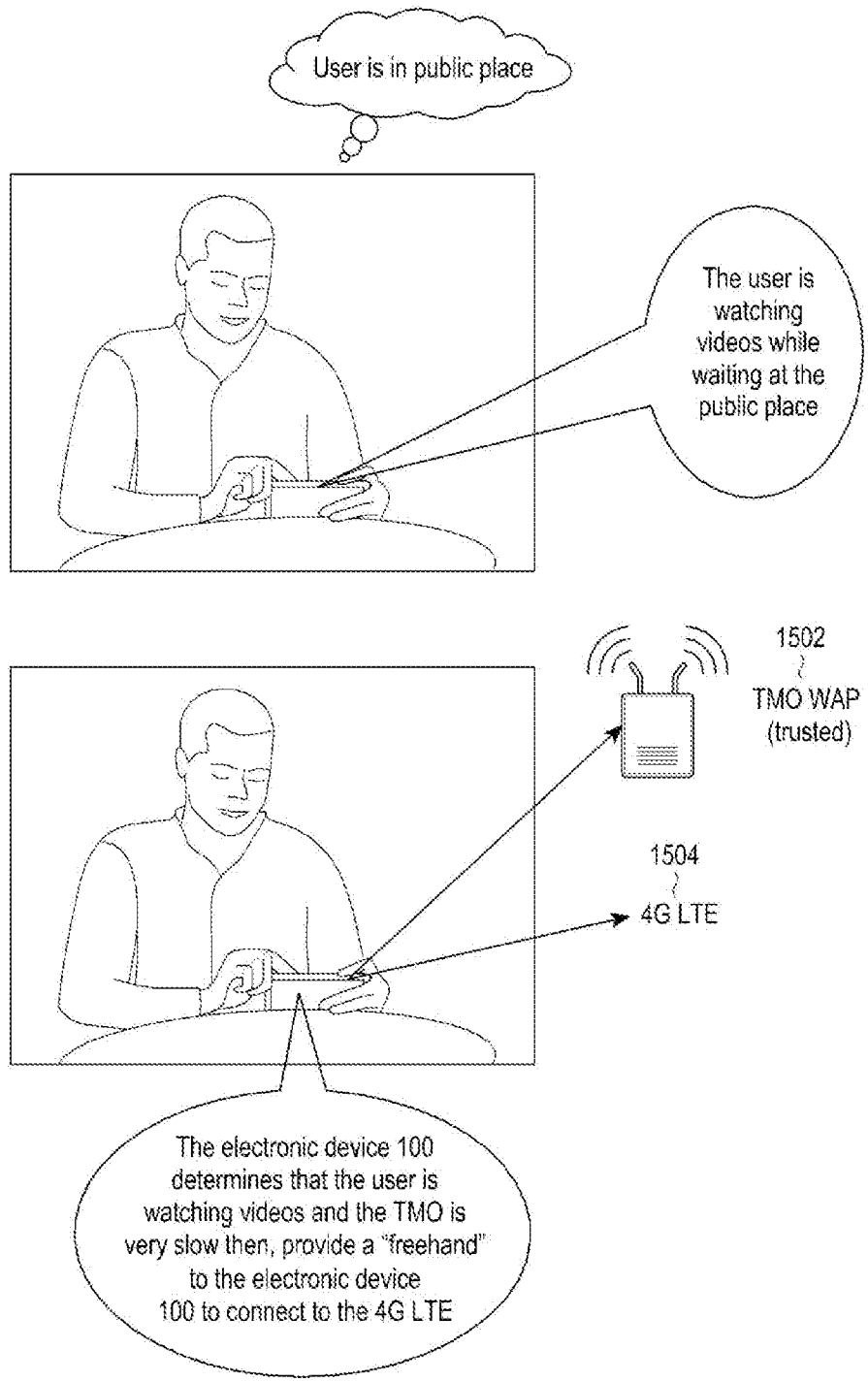
FIG. 15 is an example scenario in which the electronic device establishes the wireless connection with the WAP based on the current state of the electronic device, according to an embodiment of the present disclosure.

FIG. 15 is an example scenario in which the electronic device 100 establishes the wireless connection with the WAP based on the current state of the electronic device 100, according to an embodiment of the present disclosure.

Consider a scenario in which the user is located in a public place, and the user is watching videos in his electronic device 100. Further, the electronic device 100 detects one TMO WAP 1502 (2 Mbps, unlimited data) which has a poor coverage in the public place, where the user is currently located. Further, 4G LTE 1504 in the electronic device 100 has a good coverage however, there is no WAP found in the public place.

The electronic device 100 receives the ANDSF steering-control instructions to connect to the TMO WAP 1502, however the browsing experience is very slow as there is the poor coverage in the public place. Under such circumstance, the electronic device 100 provides a "free-hand" to connect with the 4G LTE 1504, which is faster and provides good connectivity with the network 200. Hence, the electronic device 100 connects with the 4G LTE 1504 which offers high speed internet connection without any buffering. This enhance the user's browsing experience and provide an enhanced access network selection for connecting with the network 200.

Figure 16:
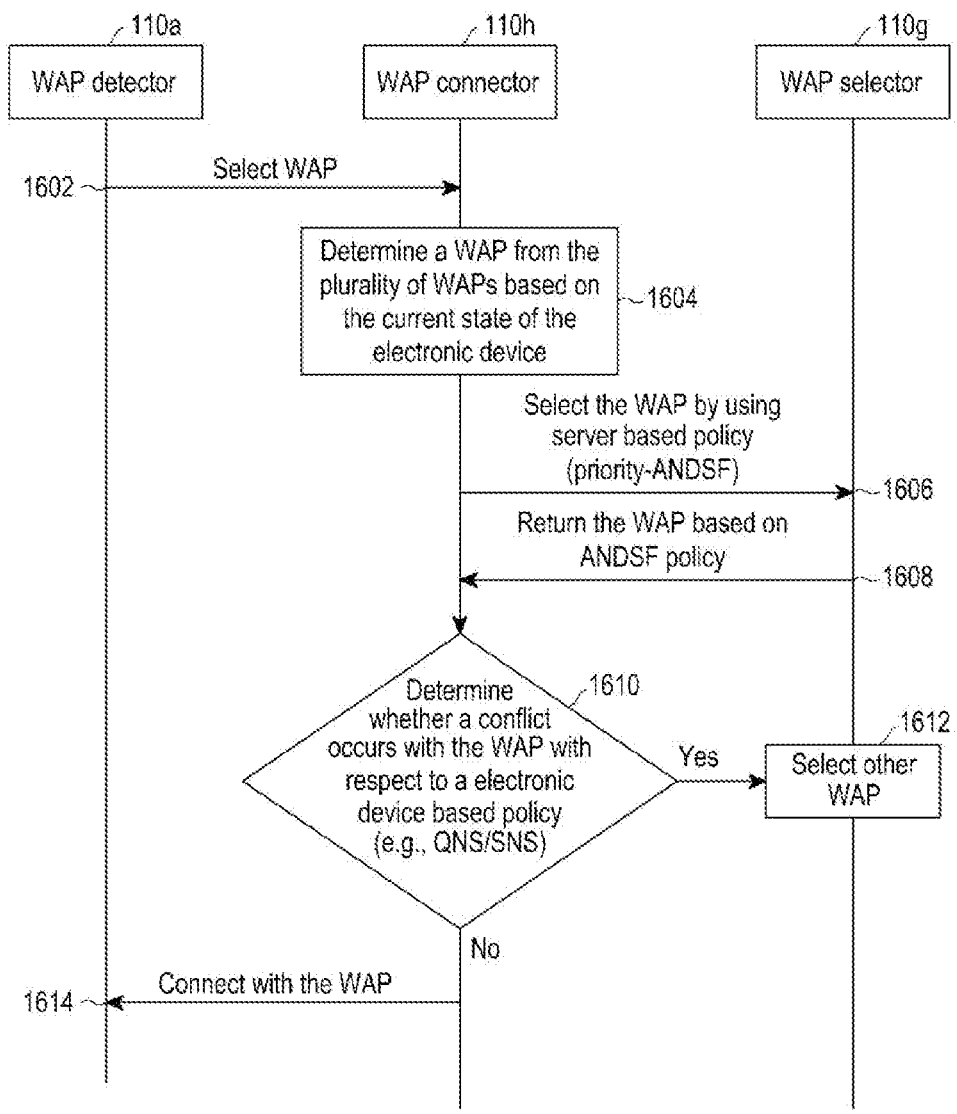
FIG. 16 is a sequence diagram illustrating various signaling messages communicated between a WAP connector and a WAP selector of the electronic device for establishing the wireless connection with the WAP, according to an embodiment of the present disclosure.

FIG. 16 is a sequence diagram illustrating various signaling messages communicated between the WAP connector 110h and the WAP selector 110g of the electronic device 100 for establishing the wireless connection with the WAP 102a, according to an embodiment of the present disclosure.

At operation 1602, the WAP detector 110a is configured to send a message such as 'select WAP' to the WAP connector 110h of the electronic device 100. In response to the message from the WAP detector 110a, at operation 1604, the WAP connector 110h is configured to detect the plurality of WAPs 102 and further the WAP connector 110h is configured to determine the current state of the electronic device 100.

At operation 1606, the WAP connector 110h is configured to send a request to the WAP selector 110g to select the WAP 102a based on the current state of the electronic device 100. Let the current state of the electronic device 100 indicates that the user preference is server based policy such as priority is ANDSF policy. Based on the request from the WAP connector 110h, the WAP selector 110g is configured to select the WAP 102a based on ANDSF policy and transmit the selected WAP1 to the WAP connector 110h, at operation 1608.

Further, at operation 1610, the WAP connector 110h is configured to determine whether there exists the conflict with the WAP with respect to the electronic device-policy such as QNS, SNS or the like. If there exists the conflict then, the WAP connector 110h is configured to send the message to the WAP selector 110g to select other WAP at operation 1612.

If there is no conflict between the server-based policy and the electronic-device based policy then, the WAP connector 110h is configured to connect with the WAP 102a at operation 1614.

Figure 17:
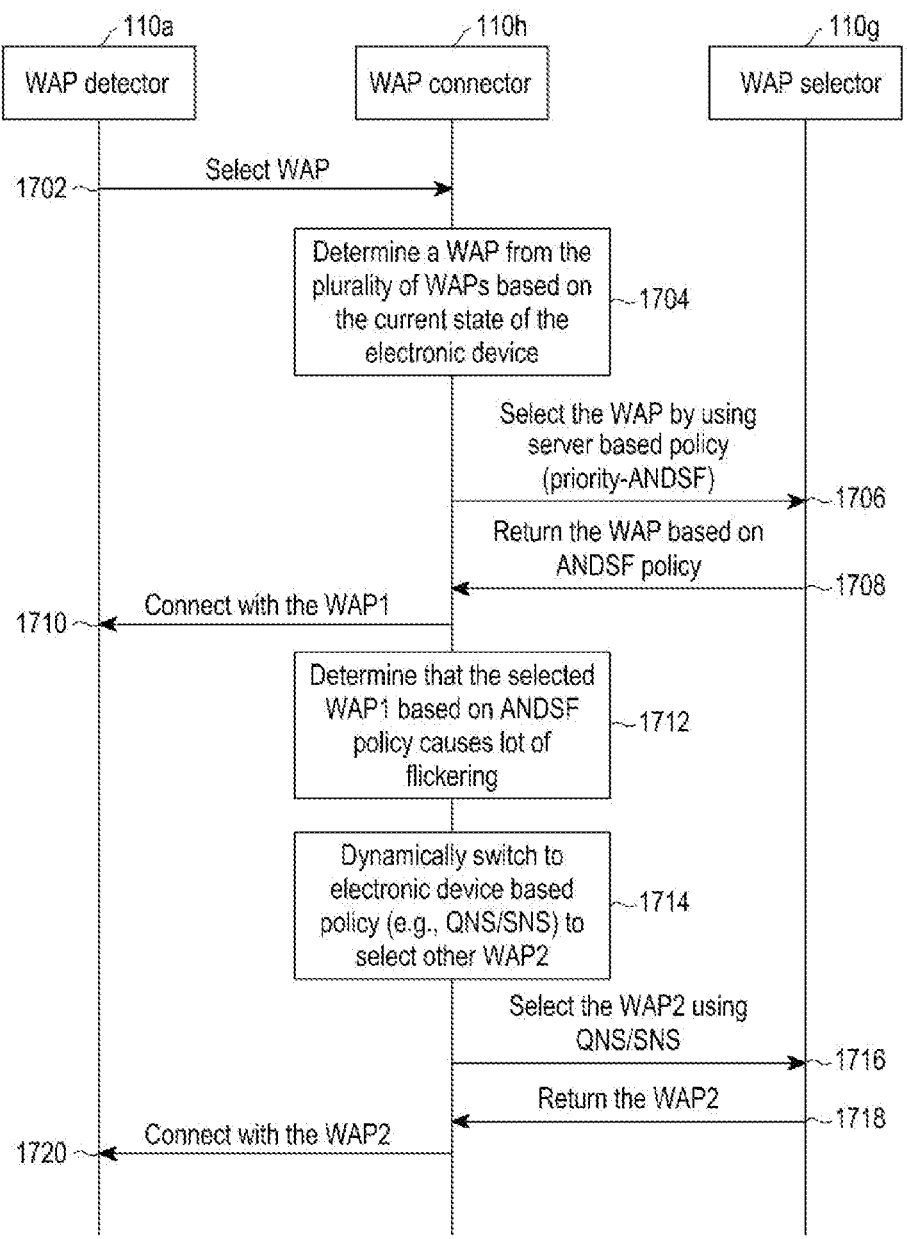
FIG. 17 is a sequence diagram illustrating various signaling messages communicated between the WAP connector and the WAP selector of the electronic device for establishing the wireless connection with the WAP, according to an embodiment of the present disclosure.

FIG. 17 is a sequence diagram illustrating various signaling messages communicated between the WAP connector 110h and the WAP selector 110g of the electronic device 100 for establishing the wireless connection with the WAP 102a, according to an embodiment of the present disclosure.

At operation 1702, the WAP detector 110a is configured to send a message such as 'select WAP' to the WAP connector 110h of the electronic device 100. In response to the message from the WAP detector 110a, at operation 1704, the WAP connector 110h is configured to detect the plurality of WAPs 102 and further the WAP connector 110h is configured to determine the current state of the electronic device 100.

At operation 1706, the WAP connector 110h is configured to send a request to the WAP selector 110g to select the WAP 102a based on the current state of the electronic device 100. Let the current state of the electronic device 100 indicates that the user preference is server based policy such as priority is ANDSF policy. Based on the request from the WAP connector 110h, the WAP selector 110g is configured to select the WAP1 (i.e., WAP 102a) based on ANDSF policy and transmit the selected WAP1 to the WAP connector 110h, at operation 1708.

At operation 1710, the WAP connector 110h is configured to connect with the WAP1. Further, the WAP connector 110h is configured to determine that the selected WAP1 based on ANDSF policy causes lot of flickering at operation 1712. In response to the determination, the WAP connector 110h is configured to dynamically switch to the electronic-device based policy (e.g., QNS/SNS) to select other WAP2 at operation 1714.

At operation 1716, the WAP connector 110h is configured to send the request to the WAP selector 110g to select the WAP based on the based on the electronic-device based policy. In response to the request, the WAP selector 110g is configured to select the WAP2 (i.e., WAP 102b) based on the electronic-device based policy and transmit the WAP2 to the WAP connector 110h at operation 1718. Further, the WAP connector 110h is configured to connect with the WAP2 from the plurality of WAPs 102 at operation 1720. In an embodiment of the present disclosure, WAP connector 110h is configured to fall back to WAP2 for better connectivity.

The embodiments disclosed herein can be implemented through at least one software program running on at least one hardware device and performing network management functions to control the elements. The elements shown in the FIGS. 1 through 17 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for managing a wireless connection in a device, comprising:
   detecting a plurality of wireless access points (WAPs);
   determining a current state of the device;
   determining a WAP from the plurality of WAPs based on the current state of the device and a priority data associated with each of the plurality of WAPs; and
   establishing the wireless connection with the WAP.

2. The method of claim 1, wherein determining the WAP from the plurality of WAPs based on the current state of the device and the priority data associated with each of the plurality of WAPs comprises:
   obtaining the priority data associated with each of the plurality of WAPs;
   determining a new priority data for each of the plurality of WAPs based on the current state of the device;
   reprioritizing each of the plurality of WAPs based on the new priority data; and
   dynamically selecting the WAP having a highest priority from the plurality of WAPs to establish the wireless connection.

3. The method of claim 1, further comprising:
   determining whether a data speed of the WAP meets a threshold criterion;
   determining the current state of the device;
   dynamically determining other WAP from the plurality of WAPs based on the current state of the device; and
   dynamically establishing the wireless connection with the other WAP from the plurality of WAPs in response to determining that the data speed of the WAP does not meet the threshold criterion.

4. The method of claim 1, further comprising:
   determining a conflict between a plurality of WAP policies to connect to the WAP from the plurality of WAPs, before determining the current state of the device.

5. A method for managing a wireless connection in a device, comprising:
   detecting a plurality of wireless access points (WAPs);
   determining a WAP policy to connect to a first WAP from the plurality of WAPs;
   determining a current state of the device;
   determining a second WAP from the plurality of WAPs based on the current state of the device and a priority data associated with each of the plurality of WAPs, wherein the second WAP from the plurality of WAPs is determined by overriding the WAP policy; and
   establishing the wireless connection with the second WAP.

6. The method of claim 5, wherein the current state indicates at least one of a number of applications running in a foreground in the device, a number of applications running in a background in the device, a type of application running in the foreground in the device, a type of application running in the background in the device, a current state of battery of the device, a user preference, and a WAP operator preference.

7. The method of claim 5, wherein determining the second WAP from the plurality of WAPs based on the current state of the device and a priority data associated with each of the plurality of WAPs comprises:
   obtaining the priority data associated with each of the plurality of WAPs;
   determining a new priority data for each of the plurality of WAPs based on the current state of the device;
   reprioritizing each of the plurality of WAPs based on the new priority data; and
   dynamically selecting the second WAP having a highest priority from the plurality of WAPs to establish the wireless connection.

8. The method of claim 5, wherein the priority data is a weightage value assigned to each WAP over the plurality of WAPs.

9. The method of claim 5, wherein the priority data for each of the plurality of WAPs is provided in the WAP policy shared by one of a server and the device.

10. The method of claim 5, wherein the WAP policy comprises at least one of a device-defined policy, a server-defined policy, and an operator defined policy.

11. The method of claim 5, further comprising:
    determining whether a data speed of the second WAP meets a threshold criterion;
    determining the current state of the device;
    dynamically determining other WAP from the plurality of WAPs based on the current state of the device; and
    dynamically establishing the wireless connection with the other WAP from the plurality of WAPs in response to determining that the data speed of the second WAP does not meet the threshold criterion.

12. A device for managing a wireless connection, comprising:
    a transceiver configured to transmit and receive data; and
    at least one processor configured to:
      detect a plurality of wireless access points (WAPs),
      determine a current state of the device,
      determine a WAP from the plurality of WAPs based on the current state of the device and a priority data associated with each of the plurality of WAPs, and
      establish the wireless connection with the WAP.

13. The device of claim 12, wherein to determine the WAP from the plurality of WAPs based on the current state of the device and the priority data associated with each of the plurality of WAPs, the at least one processor is configured to:
    obtain the priority data associated with each of the plurality of WAPs;
    determine a new priority data for each of the plurality of WAPs based on the current state of the device;
    reprioritize each of the plurality of WAPs based on the new priority data; and
    dynamically select the WAP having a highest priority from the plurality of WAPs to establish the wireless connection.

14. The device of claim 12, wherein the at least one processor is further configured to:

determine whether a data speed of the WAP meets a threshold criterion;

determine the current state of the device;

dynamically determine other WAP from the plurality of WAPs based on the current state of the device; and dynamically establish the wireless connection with the other WAP from the plurality of WAPs in response to determining that the data speed of the WAP does not meet threshold criterion.

15. The device of claim 12, wherein the at least one processor is further configured to:

determine a conflict between a plurality of WAP policies to connect to the WAP from the plurality of WAPs, before determining the current state of the device.

16. The device of claim 12, wherein the at least one processor is further configured to determine a WAP policy to connect to a first WAP from the plurality of WAPs, wherein, to determine the WAP from the plurality of WAPs, the at least one processor is configured to determine a second WAP from the plurality of WAPs based on the current state of the device and the priority data associated with each of the plurality of WAPs, and wherein the second WAP from the plurality of WAPs is determined by overriding the WAP policy.

17. The device of claim 16, wherein the current state indicates at least one of a number of applications running in a foreground in the device, a number of applications running in a background in the device, a type of application running in the foreground in the device, a type of application running in the background in the device, a current state of battery of the device, a user preference, and a WAP operator preference.

18. The device of claim 16, wherein the priority data is a weightage value assigned to each WAP over the plurality of WAPs.

19. The device of claim 16, wherein the priority data for each of the plurality of WAPs is provided in the WAP policy shared by one of a server and the device.

20. The device of claim 16, wherein the WAP policy comprises at least one of a device-defined policy, a server-defined policy, and an operator defined policy.

* * * * *